US012807087B2

(12) United States Patent
Tullis et al.

(10) Patent No.: US 12,807,087 B2
(45) Date of Patent: Nov. 24, 2026

(54) VEHICLE BUMPER, COMPOSITE MATERIALS FOR VEHICLE BUMPERS, AND METHODS THEREOF

(71) Applicants: Productive Research LLC, West Bloomfield, MI (US); Material Sciences Corporation, Canton, MI (US)

(72) Inventors: Bryan Joseph Tullis, Commerce Township, MI (US); Matthew Murphy, Canton, MI (US)

(73) Assignees: PRODUCTIVE RESEARCH LLC, West Bloomfield, MI (US); MATERIAL SCIENCES CORPORATION, Canton, MI (US)

( * ) Notice: Subject to any disclaimer, the term of this patent is extended or adjusted under 35 U.S.C. 154(b) by 206 days.

(21) Appl. No.: 17/501,535

(22) Filed: Oct. 14, 2021

(65) Prior Publication Data

US 2022/0118928 A1 Apr. 21, 2022

Related U.S. Application Data

(60) Provisional application No. 63/094,761, filed on Oct. 21, 2020, provisional application No. 63/092,408, filed on Oct. 15, 2020.

(51) Int. Cl.
*B60R 19/03* (2006.01)
*B60R 19/18* (2006.01)

(52) U.S. Cl.
CPC .............. *B60R 19/03* (2013.01); *B60R 19/18* (2013.01); *B60R 2019/1813* (2013.01)

(58) Field of Classification Search
CPC . B60R 19/03; B60R 19/18; B60R 2019/1813; B60R 19/02; B60R 19/1813; B60R 19/1833; B60R 19/1853; B60R 19/1886; B60R 2019/1833; B60R 209/1853; B60R 2019/1886; B60R 2019/188; B32B 27/20; C08K 3/04; C08K 3/041; C09C 1/44; C09C 1/48;
(Continued)

(56) References Cited

U.S. PATENT DOCUMENTS 213,015 A 3/1879 Wahl et al.
777,656 A 12/1904 Banning
(Continued)

FOREIGN PATENT DOCUMENTS

CA 1182004 A 2/1985
CA 1290533 C 10/1991
(Continued)

OTHER PUBLICATIONS

CN 102470813 Machine Translation (Year: 2012).*
(Continued)

*Primary Examiner* — Zachary M Davis
(74) *Attorney, Agent, or Firm* — The Dobrusin Law Firm, P.C.

(57) ABSTRACT

The teachings herein are directed to light weight bumpers and methods for manufacturing a light weight bumper. The bumper is formed from a multi-layered composite material having a core layer that includes a non-metallic filler and preferably includes a conductive non-metallic filler, such as a carbon black filler.

16 Claims, 12 Drawing Sheets

(58) Field of Classification Search
CPC ......... C09C 1/482; C09C 1/485; C09C 1/487; C09C 1/50; C09C 1/52; C09C 1/54; C09C 1/56; C09C 1/565; C09C 1/58; C09C 1/60
See application file for complete search history.

(56) References Cited

U.S. PATENT DOCUMENTS

| | | | |
|---|---|---|---|
| 1,972,835 | A | 9/1934 | Tainton |
| 2,286,980 | A | 6/1942 | Schanz |
| 3,086,899 | A | 4/1963 | Smith et al. |
| 3,112,213 | A | 11/1963 | Lusa |
| 3,205,337 | A | 9/1965 | Hiemenz |
| 3,527,667 | A | 9/1970 | Larscn et al. |
| 3,764,277 | A | 10/1973 | Hollis |
| 3,832,433 | A | 8/1974 | Schaffer et al. |
| 3,873,643 | A | 3/1975 | Wu et al. |
| 3,882,914 | A | 5/1975 | Strutz |
| 3,900,651 | A | 8/1975 | Hoppe et al. |
| 3,969,868 | A | 7/1976 | Bainter et al. |
| 4,037,073 | A | 7/1977 | Becker |
| 4,048,355 | A | 9/1977 | Sakayori et al. |
| 4,110,117 | A | 8/1978 | McLeod |
| 4,110,505 | A | 8/1978 | Prewo |
| 4,171,394 | A | 10/1979 | Patil et al. |
| 4,229,504 | A | 10/1980 | Brachman |
| 4,255,482 | A | 3/1981 | Udagawa |
| 4,267,679 | A | 5/1981 | Thompson |
| 4,313,996 | A | 2/1982 | Newman et al. |
| 4,329,561 | A | 5/1982 | Schafcr et al. |
| 4,330,587 | A | 5/1982 | Woodbrey |
| 4,353,951 | A | 10/1982 | Yukitoshi et al. |
| 4,369,222 | A | 1/1983 | Hedrick et al. |
| 4,369,830 | A | 1/1983 | Generali |
| 4,383,942 | A | 5/1983 | Davcnport |
| 4,421,892 | A | 12/1983 | Kasahara et al. |
| 4,424,254 | A | 1/1984 | Hedrick et al. |
| 4,429,076 | A | 1/1984 | Saito et al. |
| 4,461,665 | A | 7/1984 | Schertler |
| 4,474,685 | A | 10/1984 | Annis |
| 4,482,600 | A | 11/1984 | Matsumoto et al. |
| 4,513,033 | A | 4/1985 | Patil et al. |
| 4,522,875 | A | 6/1985 | Still, Jr. et al. |
| 4,601,941 | A | 7/1986 | Lutz et al. |
| 4,617,231 | A | 10/1986 | Hamada et al. |
| 4,650,723 | A | 3/1987 | Furuya |
| 4,650,951 | A | 3/1987 | Koga et al. |
| 4,668,545 | A | 5/1987 | Lowe |
| 4,678,699 | A | 7/1987 | Grcgor et al. |
| 4,678,707 | A | 7/1987 | Shinozaki et al. |
| 4,690,856 | A | 9/1987 | Ito et al. |
| 4,731,401 | A | 3/1988 | Moteki |
| 4,749,623 | A | 6/1988 | Endo et al. |
| 4,753,850 | A | 6/1988 | Ibe et al. |
| 4,758,627 | A | 7/1988 | Wilkus et al. |
| 4,759,972 | A | 7/1988 | Yoshiga et al. |
| 4,759,994 | A | 7/1988 | Lesourd |
| 4,788,099 | A | 11/1988 | Fukushima et al. |
| 4,792,499 | A | 12/1988 | Shindou et al. |
| 4,794,050 | A | 12/1988 | Campbell et al. |
| 4,857,377 | A | 8/1989 | Daimon et al. |
| 4,873,149 | A | 10/1989 | Shinoda et al. |
| 4,888,247 | A | 12/1989 | Zweben et al. |
| 4,937,125 | A | 6/1990 | Lepoetre et al. |
| 4,942,193 | A | 7/1990 | Van Buskirk et al. |
| 4,978,582 | A | 12/1990 | Stamm et al. |
| 5,030,488 | A | 7/1991 | Sobolcv |
| 5,030,816 | A | 7/1991 | Strecker |
| 5,047,479 | A | 9/1991 | Ohmae et al. |
| 5,061,778 | A | 10/1991 | Uchida et al. |
| 5,063,098 | A | 11/1991 | Niwa et al. |
| 5,084,357 | A | 1/1992 | Imai et al. |
| 5,093,204 | A | 3/1992 | Watanabe et al. |
| 5,100,737 | A | 3/1992 | Colombier et al. |
| 5,143,790 | A | 9/1992 | Sattinger |
| 5,176,852 | A | 1/1993 | Kondo et al. |
| 5,216,075 | A | 6/1993 | Papazoglou |
| 5,219,629 | A | 6/1993 | Sobolev |
| 5,227,216 | A | 7/1993 | Pettit |
| 5,278,231 | A | 1/1994 | Chundury |
| 5,347,099 | A | 9/1994 | Gissinger et al. |
| 5,354,607 | A | 10/1994 | Swift et al. |
| 5,410,133 | A | 4/1995 | Matsein et al. |
| 5,418,073 | A | 5/1995 | Loth et al. |
| 5,489,180 | A | 2/1996 | Ichihara et al. |
| 5,518,836 | A | 5/1996 | McCullough |
| 5,548,027 | A | 8/1996 | Heucher et al. |
| 5,578,384 | A | 11/1996 | Kingston |
| 5,604,033 | A | 2/1997 | Arthurs et al. |
| 5,614,930 | A | 3/1997 | Osborne et al. |
| 5,658,264 | A | 8/1997 | Samson |
| 5,679,441 | A | 10/1997 | Saclcns et al. |
| 5,691,037 | A | 11/1997 | McCutcheon et al. |
| 5,753,885 | A | 5/1998 | Iwasa et al. |
| 5,778,813 | A | 7/1998 | Kennedy |
| 5,814,395 | A | 9/1998 | Soellaart-Roelofsen |
| 5,846,461 | A | 12/1998 | Collins et al. |
| 5,866,215 | A | 2/1999 | Karbhari |
| 5,866,868 | A | 2/1999 | Hirane |
| 5,894,045 | A | 4/1999 | Desrondiers |
| 5,916,469 | A | 6/1999 | Scoles et al. |
| 5,939,213 | A | 8/1999 | Bowden et al. |
| 5,939,512 | A | 8/1999 | Gervasi et al. |
| 5,951,800 | A | 9/1999 | Pettit |
| 6,004,650 | A | 12/1999 | Schweizer |
| 6,012,493 | A | 1/2000 | Remke et al. |
| 6,050,208 | A | 4/2000 | Kennedy |
| 6,090,465 | A | 7/2000 | Stcclc et al. |
| 6,099,055 | A | 8/2000 | Hirota et al. |
| 6,126,865 | A | 10/2000 | Haak et al. |
| 6,138,435 | A | 10/2000 | Kocher et al. |
| 6,146,488 | A | 11/2000 | Okada et al. |
| 6,177,173 | B1 | 1/2001 | Nelson |
| 6,202,462 | B1 | 3/2001 | Hansen et al. |
| 6,268,408 | B1 | 7/2001 | Dispcnza |
| 6,294,257 | B1 | 9/2001 | Tsukakoshi et al. |
| 6,346,292 | B1 | 2/2002 | Grubb et al. |
| 6,346,491 | B1 | 2/2002 | DeAngelis et al. |
| 6,387,535 | B1 | 5/2002 | Mantel |
| 6,428,905 | B1 | 8/2002 | Bchr et al. |
| 6,455,148 | B1 | 9/2002 | Spears et al. |
| 6,465,110 | B1 | 10/2002 | Boss et al. |
| 6,534,194 | B2 | 3/2003 | Weihs et al. |
| 6,592,968 | B1 | 7/2003 | Schmit et al. |
| 6,592,979 | B1 | 7/2003 | DcTcrcsa |
| 6,659,518 | B2 | 12/2003 | Ponsonnaille et al. |
| 6,673,468 | B1 | 1/2004 | Behr et al. |
| 6,741,221 | B2 | 5/2004 | Aisenbrey |
| 6,764,772 | B2 | 7/2004 | Clyne et al. |
| 6,841,212 | B2 | 1/2005 | Bicakci-Jenkins et al. |
| 6,841,252 | B2 | 1/2005 | Kroes et al. |
| 6,861,156 | B2 | 3/2005 | Palm |
| 6,865,805 | B2 | 3/2005 | Dispenza et al. |
| 6,870,516 | B2 | 3/2005 | Aisenbrey |
| 6,896,828 | B2 | 5/2005 | Fox |
| 7,157,140 | B1 | 1/2007 | Hoppe et al. |
| 7,261,932 | B2 | 8/2007 | Kennedy |
| 7,316,838 | B2 | 1/2008 | Aisenbrey |
| 7,390,564 | B2 | 6/2008 | Yuasa et al. |
| 7,459,115 | B2 | 12/2008 | Stadler et al. |
| 7,553,553 | B2 | 6/2009 | Palumbo |
| 7,569,624 | B2 | 8/2009 | Kolbe et al. |
| 7,592,388 | B2 | 9/2009 | Wick et al. |
| 7,648,058 | B2 | 1/2010 | Straza |
| 7,748,184 | B1 | 7/2010 | Whcclcr et al. |
| 7,833,630 | B2 | 11/2010 | Sigler |
| 7,879,454 | B2 | 2/2011 | Manicke |
| 7,927,708 | B2 | 4/2011 | Mizrahi |
| 7,959,058 | B1 | 6/2011 | Crane |
| 7,981,501 | B2 | 7/2011 | Kwag et al. |
| 8,034,428 | B2 | 10/2011 | Vcrhacghc |
| 8,071,205 | B2 | 12/2011 | Tsuchiya |
| 8,186,566 | B2 | 5/2012 | Abramovici et al. |
| 8,216,658 | B2 | 7/2012 | Rajabali |

(56) References Cited

U.S. PATENT DOCUMENTS

| | | | | |
|---|---|---|---|---|
| 8,308,225 | B2 | 11/2012 | Owen et al. | |
| 8,309,004 | B2 | 11/2012 | Pinard | |
| 8,328,971 | B2 | 12/2012 | Kia et al. | |
| 8,344,070 | B2 | 1/2013 | Squirc et al. | |
| 8,397,976 | B2 | 3/2013 | Abramovici et al. | |
| 8,404,352 | B2 | 3/2013 | Schwab et al. | |
| 8,450,842 | B2 | 5/2013 | Ueda | |
| 8,475,930 | B2 | 7/2013 | Shoji et al. | |
| 8,518,521 | B2 | 8/2013 | Aso et al. | |
| 8,573,357 | B1 | 11/2013 | Hibbs | |
| 8,796,580 | B2 * | 8/2014 | Mizrahi | B23K 31/02 219/118 |
| 8,852,733 | B2 | 10/2014 | Kwag et al. | |
| 8,888,169 | B2 | 11/2014 | Howe et al. | |
| 8,889,263 | B2 | 11/2014 | Rice | |
| 9,005,768 | B2 | 4/2015 | Mizrahi | |
| 9,115,264 | B2 | 8/2015 | Mizrahi et al. | |
| 9,415,568 | B2 | 8/2016 | Mizrahi et al. | |
| 10,696,830 | B2 * | 6/2020 | Kim | C08J 5/043 |
| 11,331,880 | B2 * | 5/2022 | Mizrahi | B32B 7/10 |
| 2002/0108678 | A1 | 8/2002 | Montano et al. | |
| 2002/0160180 | A1 | 10/2002 | Yamato et al. | |
| 2003/0064241 | A1 | 4/2003 | Suzuki et al. | |
| 2003/0082335 | A1 | 5/2003 | Clyne et al. | |
| 2003/0099857 | A1 | 5/2003 | Nomura et al. | |
| 2003/0162049 | A1 | 8/2003 | Muijnck et al. | |
| 2004/0116602 | A1 | 6/2004 | Botros | |
| 2004/0209092 | A1 | 10/2004 | Near | |
| 2004/0222863 | A1 | 11/2004 | Aisenbrey | |
| 2004/0227688 | A1 | 11/2004 | Aisenbrey | |
| 2004/0233112 | A1 | 11/2004 | Aisenbery | |
| 2004/0239578 | A1 | 12/2004 | Aisenbrey | |
| 2004/0244789 | A1 | 12/2004 | Jentgens | |
| 2004/0247927 | A1 | 12/2004 | Kurz | |
| 2005/0000947 | A1 | 1/2005 | Sigler et al. | |
| 2005/0001780 | A1 | 1/2005 | Aisenbrey | |
| 2005/0133575 | A1 | 6/2005 | Gayden et al. | |
| 2005/0140042 | A1 | 6/2005 | Aisenbrey | |
| 2005/0166956 | A1 | 8/2005 | Aisenbrey | |
| 2005/0181203 | A1 | 8/2005 | Rawlings et al. | |
| 2005/0204544 | A1 | 9/2005 | Aisenbrey | |
| 2005/0205712 | A1 | 9/2005 | Aiscnbrcy | |
| 2005/0206270 | A1 | 9/2005 | Aisenbrey | |
| 2005/0206289 | A1 | 9/2005 | Aisenbrey | |
| 2005/0206491 | A1 | 9/2005 | Aisenbrey | |
| 2005/0208251 | A1 | 9/2005 | Aiscnbrcy | |
| 2005/0208862 | A1 | 9/2005 | Aiscnbrcy | |
| 2005/0212161 | A1 | 9/2005 | Aisenbrey | |
| 2005/0212162 | A1 | 9/2005 | Aisenbrey | |
| 2005/0214553 | A1 | 9/2005 | Yannetti et al. | |
| 2005/0224280 | A1 | 10/2005 | Aisenbrey | |
| 2005/0244660 | A1 | 11/2005 | Yuasa et al. | |
| 2005/0271859 | A1 | 12/2005 | Tuss | |
| 2006/0003667 | A1 | 1/2006 | Aisenbrey | |
| 2006/0010807 | A1 | 1/2006 | Whitley | |
| 2006/0060296 | A1 | 3/2006 | Sigler et al. | |
| 2006/0060690 | A1 | 3/2006 | Aiscnbrcy | |
| 2006/0062977 | A1 | 3/2006 | Sigler et al. | |
| 2006/0071862 | A1 | 4/2006 | Aisenbrey | |
| 2006/0091887 | A1 | 5/2006 | Aisenbrey | |
| 2006/0134395 | A1 | 6/2006 | Sigler et al. | |
| 2006/0134449 | A1 | 6/2006 | Sigler et al. | |
| 2006/0134450 | A1 | 6/2006 | Sigler et al. | |
| 2006/0222869 | A1 | 10/2006 | Cai et al. | |
| 2006/0269701 | A1 | 11/2006 | Gauriat et al. | |
| 2006/0269738 | A1 | 11/2006 | Kimberly | |
| 2006/0286333 | A1 | 12/2006 | Wang et al. | |
| 2007/0062758 | A1 | 3/2007 | Jensen et al. | |
| 2007/0104966 | A1 | 5/2007 | Calvez et al. | |
| 2007/0184288 | A1 | 8/2007 | Garamszegi et al. | |
| 2007/0186614 | A1 | 8/2007 | Pinard | |
| 2007/0187469 | A1 | 8/2007 | Chen et al. | |
| 2007/0196637 | A1 | 8/2007 | Good et al. | |
| 2007/0295704 | A1 | 12/2007 | Sigler et al. | |
| 2008/0012389 | A1 | 1/2008 | Mittermeier et al. | |
| 2008/0032094 | A1 | 2/2008 | Raghavendran | |
| 2008/0036241 | A1 | 2/2008 | Aiscnbrcy | |
| 2008/0036251 | A1 | 2/2008 | Endo et al. | |
| 2008/0081149 | A1 | 4/2008 | Fuerst et al. | |
| 2008/0254310 | A1 | 10/2008 | Palumbo et al. | |
| 2008/0311363 | A1 | 12/2008 | Haskett et al. | |
| 2009/0020187 | A1 | 1/2009 | Russell et al. | |
| 2009/0142538 | A1 | 6/2009 | Siglcr et al. | |
| 2009/0159034 | A1 | 6/2009 | Katayama et al. | |
| 2009/0226755 | A1 | 9/2009 | Siglcr et al. | |
| 2009/0280348 | A1 | 11/2009 | Patberg et al. | |
| 2010/0035080 | A1 | 2/2010 | Sigler et al. | |
| 2010/0040902 | A1 | 2/2010 | Mizrahi | |
| 2010/0084380 | A1 | 4/2010 | Tczlaff et al. | |
| 2010/0098929 | A1 | 4/2010 | Dispenza | |
| 2010/0196736 | A1 | 8/2010 | Boger et al. | |
| 2010/0233505 | A1 | 9/2010 | Boger et al. | |
| 2011/0049913 | A1 | 3/2011 | Bernt et al. | |
| 2011/0052910 | A1 | 3/2011 | Gunnink | |
| 2011/0162788 | A1 | 7/2011 | Mizrahi | |
| 2011/0188927 | A1 * | 8/2011 | Mizrahi | B32B 27/28 219/118 |
| 2011/0200816 | A1 | 8/2011 | Mizrahi et al. | |
| 2012/0115872 | A1 | 5/2012 | Mesangeau et al. | |
| 2012/0196138 | A1 | 8/2012 | Botros et al. | |
| 2012/0214018 | A1 * | 8/2012 | Mizrahi | B32B 15/14 428/600 |
| 2013/0136944 | A1 | 5/2013 | Mizrahi et al. | |
| 2013/0281576 | A1 | 10/2013 | Kobayshi et al. | |
| 2014/0034233 | A1 * | 2/2014 | VanSweden | B32B 27/32 156/60 |
| 2014/0162086 | A1 | 6/2014 | Mizrahi | |
| 2014/0286699 | A1 | 9/2014 | Mizrahi | |
| 2015/0328864 | A1 | 11/2015 | Mizrahi et al. | |
| 2016/0222999 | A1 | 8/2016 | Mizrahi | |
| 2016/0339674 | A1 | 11/2016 | Mizrahi et al. | |
| 2016/0339675 | A1 | 11/2016 | Mizrahi | |
| 2017/0203708 | A1 * | 7/2017 | Jaradi | B60R 19/18 |
| 2017/0233010 | A1 * | 8/2017 | Sytsma | B60R 19/48 296/193.1 |
| 2018/0029332 | A1 | 2/2018 | Mizrahi et al. | |
| 2018/0126700 | A1 | 5/2018 | Mizrahi | |
| 2018/0186984 | A1 * | 7/2018 | Kim | B60R 19/02 |
| 2018/0250914 | A1 | 9/2018 | Mizrahi et al. | |
| 2019/0127588 | A1 * | 5/2019 | Van Raalten | C09C 1/50 |
| 2020/0001574 | A1 | 1/2020 | Mizrahi et al. | |
| 2020/0272182 | A1 | 8/2020 | Liang et al. | |

FOREIGN PATENT DOCUMENTS

| | | | | |
|---|---|---|---|---|
| CA | 2041560 | A1 | 11/1991 | |
| CA | 2389078 | A1 | 5/2001 | |
| CA | 2478937 | A1 | 9/2003 | |
| CA | 2509699 | A1 | 7/2004 | |
| CA | 2546109 | A1 | 6/2005 | |
| CA | 2064041 | C | 7/2006 | |
| CA | 2700549 | A1 | 4/2009 | |
| CA | 2729589 | A1 | 2/2010 | |
| CA | 2731111 | A1 | 3/2010 | |
| CA | 2842609 | A1 | 2/2012 | |
| CA | 2859630 | A1 | 7/2013 | |
| CH | 284305 | | 7/1952 | |
| CH | 287794 | | 12/1952 | |
| CH | 406580 | | 1/1966 | |
| CN | 1649724 | A | 8/2005 | |
| CN | 102470813 | A * | 5/2012 | B60R 19/24 |
| DE | 877057 | | 5/1953 | |
| DE | 1912948 | | 10/1970 | |
| DE | 1729057 | | 6/1971 | |
| DE | 3622781 | A1 | 1/1988 | |
| DE | 4019202 | A1 | 12/1991 | |
| DE | 4141343 | A1 | 5/1993 | |
| DE | 4307563 | A1 | 9/1993 | |
| DE | 4300283 | A1 | 7/1994 | |
| DE | 19633306 | A1 | 10/1997 | |
| DE | 19724361 | A1 | 1/1998 | |
| DE | 19740844 | A1 | 3/1999 | |
| DE | 19810706 | A1 | 9/1999 | |

(56) References Cited

FOREIGN PATENT DOCUMENTS

| | | | | |
|---|---|---|---|---|
| DE | 19919783 | | 11/2000 | |
| DE | 19926379 | A1 | 12/2000 | |
| DE | 10011589 | A1 | 9/2001 | |
| DE | 10240384 | A1 | 3/2004 | |
| DE | 102004022677 | A1 | 5/2004 | |
| DE | 202004015784 | | 4/2005 | |
| DE | 102006013529 | A1 | 10/2006 | |
| DE | 102006049014 | A1 | 4/2008 | |
| DE | 102006049015 | A1 | 4/2008 | |
| DE | 102012103793 | A | 10/2013 | |
| EP | 0019835 | A1 | 12/1980 | |
| EP | 0069401 | | 1/1983 | |
| EP | 0089435 | A2 | 9/1983 | |
| EP | 0032355 | B1 | 5/1984 | |
| EP | 0208443 | | 6/1986 | |
| EP | 0249442 | A2 | 3/1987 | |
| EP | 0311722 | A1 | 7/1989 | |
| EP | 0322947 | B1 | 7/1989 | |
| EP | 0335642 | A2 | 10/1989 | |
| EP | 0354521 | A2 | 2/1990 | |
| EP | 0356837 | B1 | 3/1990 | |
| EP | 0642920 | A2 | 3/1995 | |
| EP | 0888880 | A1 | 1/1999 | |
| EP | 1034920 | | 9/2000 | |
| EP | 1044796 | A2 | 10/2000 | |
| EP | 1095718 | A1 | 5/2001 | |
| EP | 1197323 | A1 | 4/2002 | |
| EP | 1491328 | A1 | 12/2004 | |
| EP | 1504892 | A1 | 2/2005 | |
| FR | 1245009 | | 11/1960 | |
| GB | 2062057 | A | 5/1981 | |
| GB | 2332875 | A | 7/1999 | |
| JP | 54-52182 | A | 4/1979 | |
| JP | 56132709 | A | 10/1981 | |
| JP | S57-34949 | A | 2/1982 | |
| JP | 57-077065 | A | 5/1982 | |
| JP | 58-142844 | A | 8/1983 | |
| JP | S58-142845 | A | 8/1983 | |
| JP | S58-180037 | U | 12/1983 | |
| JP | 59-145142 | A | 8/1984 | |
| JP | 60-068180 | A | 4/1985 | |
| JP | 60-201296 | A | 10/1985 | |
| JP | S61010445 | A | 1/1986 | |
| JP | 61029262 | U | 7/1986 | |
| JP | S63-242536 | A | 10/1986 | |
| JP | 61-290044 | A | 12/1986 | |
| JP | 62-151332 | A | 7/1987 | |
| JP | S62-187022 | A | 8/1987 | |
| JP | S62-286686 | A | 12/1987 | |
| JP | 63-27248 | A | 2/1988 | |
| JP | S63-193831 | A | 8/1988 | |
| JP | 01154876 | A | 4/1989 | |
| JP | H01-108207 | A | 4/1989 | |
| JP | 01-263043 | A | 10/1989 | |
| JP | 2050827 | A | 2/1990 | |
| JP | 02-231134 | A | 9/1990 | |
| JP | 02-235725 | A | 9/1990 | |
| JP | H02-297432 | A | 12/1990 | |
| JP | 03-193443 | A | 8/1991 | |
| JP | 04-077245 | A | 3/1992 | |
| JP | 04-094928 | A | 3/1992 | |
| JP | 04-127972 | A | 4/1992 | |
| JP | 04-282239 | A | 7/1992 | |
| JP | H04-229699 | A | 8/1992 | |
| JP | 05-039560 | A | 2/1993 | |
| JP | 05-039561 | A | 2/1993 | |
| JP | 5050553 | A | 3/1993 | |
| JP | 05-138802 | A | 6/1993 | |
| JP | 5-162237 | A | 6/1993 | |
| JP | 05-229054 | A | 9/1993 | |
| JP | 05-229055 | A | 9/1993 | |
| JP | 06-071806 | A | 3/1994 | |
| JP | 06-198802 | A | 7/1994 | |
| JP | 07-068701 | A | 3/1995 | |
| JP | 07-276557 | A | 10/1995 | |
| JP | 08-224827 | A | 9/1996 | |
| JP | 09-087528 | A | 3/1997 | |
| JP | 63-158242 | A | 7/1998 | |
| JP | 10-237313 | A | 9/1998 | |
| JP | H11-123790 | A | 5/1999 | |
| JP | H11-199707 | A | 7/1999 | |
| JP | 2000-263697 | A | 9/2000 | |
| JP | 2001-059187 | A | 3/2001 | |
| JP | 2011-192792 | A | 7/2011 | |
| JP | 2013-515613 | A | 5/2013 | |
| JP | 2013-519543 | A | 5/2013 | |
| KR | 10-2004-0102231 | A | 12/2004 | |
| NL | 8203423 | A | 4/1984 | |
| RU | 2149788 | C1 | 5/2000 | |
| WO | 1995/027975 | A1 | 10/1995 | |
| WO | 1999/029492 | A1 | 6/1999 | |
| WO | 1999/046461 | A1 | 9/1999 | |
| WO | 2000/013892 | A1 | 3/2000 | |
| WO | 2003/037970 | A1 | 5/2003 | |
| WO | 2007/061304 | A1 | 5/2007 | |
| WO | 2007/062061 | A2 | 5/2007 | |
| WO | 2008/118694 | A1 | 10/2008 | |
| WO | 2009/027480 | A1 | 3/2009 | |
| WO | 2009/043777 | A2 | 4/2009 | |
| WO | 2009/135786 | A1 | 11/2009 | |
| WO | WO-2010021899 | A1 * | 2/2010 | ............. B23K 11/11 |
| WO | 2011/082128 | A1 | 7/2011 | |
| WO | 2011/100734 | A1 | 8/2011 | |
| WO | 2012/126923 | A1 | 9/2012 | |
| WO | 2013/062642 | A1 | 5/2013 | |
| WO | 2013/156166 | A1 | 10/2013 | |
| WO | 2013/164173 | A1 | 11/2013 | |
| WO | 2013/178698 | A1 | 12/2013 | |
| WO | 2014/009114 | A1 | 1/2014 | |
| WO | 2014/066569 | A1 | 5/2014 | |

OTHER PUBLICATIONS

Auto Metal Direct Bumper Factory (Oct. 20, 2015) https://www.youtube.com/watch?v=S5Xe6Jq1DGE (screen shots at time = 0:10, 0:20, 0:30, 0:40, 0:48, 0:50, 1:00, 1:10, 1:20, 1:30, 1:40, 1:50, 2:00, 2:10, 2:20, 2:30, 2:40, 2:50, 3:00, 3:10, 3:20, 3:30, 3:40, 3:45, 3:50, 4:00, 4:10, 4:12, 4:20, 4:30, 4:30, 4:40, 4:46, 4:50, 4:55, 5:00, 5:10, 5:20, 5:30, 5:40, 5:50, 6:00, 6:10, 6:20, 6:30, 6:40, 6:50, 7:00).

"The Effect of Electrical Resistance on Nugget Formation During Spot Welding", J.G. Kaiser, G.J. Dunn, and T.W. Eagar, Welding Research Supplement, Jun. 1982, pp. 167-s to 174-s.

Abstract for: Dunnand, M., et al., "USILight: A cost effective solution to lighten cars", SAE Technical Paper Series, Apr. 3-6, 2006, pp. 1-10.

Abstract for: Guttman, H., et al. "Galfan—A new Coating for Automotive Tubing", SAE Technical Paper 860274, 1986.

Abstract for: Herrschaft, D. et al., "Galfan—A New Zinc-Alloy Coated Steel for Automotive Body Use", SAE Technical Paper 830517, 1983.

Abstract for: Murase, M., et al., "Development of vibration damping steel sheets for automobile oil pans", SAE Internation Congress and Exposition, Mar. 1-5, 1993; Paper No. 930023; Kawasaki Steel Corp.

Abstract for: Shimizu, T. et al., "Application of hot-dip Zn—6% Al—3%Mg Alloy Coated Steel Sheet to Automotive Body", SAE Technical Paper No. 2005-01-1330, SAE 2005 World Congress & Exhibition, Apr. 2005.

Abstract for: Welch, T. et al., "Cost and Performance Benefits for Laminated Steel Body", SAE Technical Paper 1999-01-1784, 1999.

Cambridge University, Department of Materials and Metallurgy, Newsletter (Cambridge Material Eyes), "The Gordon Laboratory, 2001," published Aug. 2001 (Issue 11), p. 2.

DiCello, J.A., "Steel-Polypropylene-Steel Laminate—A New Weight Reduction Material," SAE Congress and Exposition, Detroit, MI, Feb. 25-29, 1980.

Gunnink, J.W. Glare: An Improved Damage Tolerance Material. Proc. 19th European Conference on materials for Aerospace Applications, Dec. 6-8, 2000, pp. 17-24.

(56) References Cited

OTHER PUBLICATIONS

Haward, R.N., "Strain Hardening of Thermoplastics," Macromolecules 1993, 26, 5860-5869.
Kim et al., "Formability of AA5182/polypropylene/AA5182 Sandwhich Sheets", J. of Mat. Processing Tech., 139 (2003) 1-7.
Kim et al., "Forming and Failure Behaviour of Coated, Laminated and Sandwiched Sheet Metals: A Review", J. of Mat. Processing Tech., 63 (1997) 38-42.
Link, Todd M. "Formability and Performance of Steel-Plastic Steel Laminated Sheet Materials", SAE 2001 World Congress, Detroit, MI, Mar. 5-8, 2001.
Markaki, A.E. and T.W. Clyne, "Mechanics of Thin Ultra-Light Stainless Steel Sandwich Sheet Material, Part I. Stiffness," Acta Materialia 51 (2003) 1341-1350.
Markaki, A.E. and T.W. Clyne, "Mechanics of Thin Ultra-Light Stainless Steel Sandwich Sheet Material, Part II. Resistance to Delamination," Acta Materialia 51 (2003) 1351-1357.
Markaki, A.E., S.A. Westgate, and T.W. Clyne, "The Stiffness and Weldability of an Ultra-Light Steel Sandwich shhet Maerial with a Fibrous Metal Core," In Processing and Properties of Lightweight Cellular Metals and Structures, TMS, 2002, pp. 15-24.
McKenna, L.W. et al., "New Light-Weight Materials for Vehicle Body Panels—Aluminum/Nylon Laminates," SAE Congress and Exposition, Detroit, MI, Feb. 25-29, 1980.
Miller, William K. "Metal-Plastic Laminates for Vehicle Weight Reduction," SAE Congress and Exposition, Detroit, MI, Feb. 25-29, 1980.
Mohr et al. Development of Formable Sandwich Sheets for Automotive Applications, Adv. Eng. Materials, 7 (2005) 243-246.
Mohr, Dirk, "On the Role of Shear Strength in Sandwich Sheet Forming," International Journal of Solids and Structures 42 (2005) 1491-1512.
Shelley, Tom, "Steel Makes Lightweight Fibre Sandwich," Sep. 2001. Downloaded from http://fplreflib.findlay.co_uk/articles/1311/n-sandwich.htm on Jun. 3, 2013.
Shinozaki et al. "Spot-Weldable Composite Damping Sheets" Kawasaki Steel Giho. vol. 16 =, No. 4 pp. 288-295, 1984. www.jfe.steel.co.jp/archives/ksc_giho/j16-4/16-288-295.pdf.
Sokolova, O. et al, "Metal-polymer-metal sandwiches with local metal reinforcements: A study on formability by deep drawing and bending," Composite Structures, 94 (2011) 1-7.
Weber, Mark and Musa R. Kamal, Polymer Composites, "Estimation of the Volume Resistivity of Electrically Conductive Composites"; Dated Dec. 1997, pp. 711-725.
Weiss et al. "The Influence on Temperature on the Forming Behavior of Metal/Polymer Laminates in Sheet Metal Forming", Transactions of the ASME, 129 ( 2007) 530-537.
Weiss, M. et al., "Elastic Bending of Steel-Polymer-Steel Laminates (SPS) to a Constant Curvature," Journal of Applied Mechanics (ASME), 2006. 73 (4): p. 574-579.
www.quietsteel.com/pressrelease-022003.html. MSC Engineered Materials and Solutions Group, "Quiet Steel™ Debuts on 2003 Cadillac (Feb. 20, 2003)".
Qingshan, Li chief Editor, The Chinese Textile Press, p. 86, Jan. 2009.
Bigg, Donald M., "Mechanical, Thermal, and Electrical Properties of Metal Fiber-Filled Polymer Composites" Dec. 1979, vol. 19, No. 16, DESC pp. 1-4.

* cited by examiner

26 Chrome Layer

Span = 101.6 mm
Width = 25.0 mm
Speed = 1.0 mm/min

| Beam and load cases | Maximum Beam Deflection |
| --- | --- |
|  | $\delta_{max} = \frac{PL^3}{48EI}$ |

VEHICLE BUMPER, COMPOSITE MATERIALS FOR VEHICLE BUMPERS, AND METHODS THEREOF

FIELD

The present application relates to a vehicle bumper, to materials for forming a vehicle bumper, and to methods for manufacturing a vehicle bumper. The vehicle bumper preferably is formed of a multi-layered composite material including a core layer between two metal layers. The core layer preferably includes a non-metallic filler in a polymer matrix. The non-metal filler preferably is a conductive filler that reduces the electrical resistance of the composite material.

BACKGROUND

A bumper may provide a designed appearance to the front or rear of a vehicle. The bumper also helps to protect the vehicle during low speed impact.

Multilayered composite materials for various applications are described in U.S. patent application Ser. No. 16/792,232 filed on Feb. 15, 2020 (published as US 2020/0272182 A1), U.S. Ser. No. 13/814,352 filed on Feb. 9, 2012 (patented as U.S. Pat. No. 9,115,264 B2), and U.S. Ser. No. 13/027,423 filed on Feb. 15, 2011 (patented as U.S. Pat. No. 9,415,568 B2), each of which is incorporated herein by reference in its entirety.

In addition to appearance considerations a bumper also may have many auxiliary features. A bumper may support one or more lights or light housings and/or include an opening or covered opening for access to a towing component. A bumper may have features for supporting and/or attaching a license plate. A bumper may be attached to components for mounting the bumper to the vehicle. A bumper may have a feature related to installation of a hitch. A surface of the bumper may curve in one or more directions. For example, the bumper may curve over the top of the bumper, the bottom of the bumper, a right side of the bumper, a left side of the bumper, or any combination. For these reasons, bumpers typically have complex shapes with multiple flanges, regions with low radius curves, and require multiple design considerations.

In order to reduce vehicle fuel consumption and/or increase the energy efficiency of the vehicle, there is a need to reduce the weight of the vehicle. There is a need for methods for stamping a multi-layered composite material into a bumper. There is a need for composite materials and/or methods that reduce or eliminate delamination of a multi-layered composite material after stamping into a bumper. There is a need for a multi-layered composite material that can be coated over an edge, including an edge of a polymeric layer (e.g., with chrome, e-coat, primer, base coat, top coat, or a combination thereof), preferably the coating is uniform. There is a need for a composite material that is not deteriorated during primer or paint bake conditions. There is a need for a composite material for a bumper that resists corrosion. There is a need for a composite material having improve conductivity (e.g., reduced surface resistivity). There is a need for a composite material for a bumper that resists denting. There is a need for a bumper having reduced weight. There is a need for a bumper having improved durability, particularly where the bumper is attached to another component or to the vehicle, such as a flange area. There is a need for a multi-layer composite bumper having good appearance with no visible wrinkles. There is also a need for a multi-layered composite material having high stiffness and/or high yield strength. One or more of these needs may be achieved using the materials and methods according to the teachings herein.

SUMMARY

A first aspect of the teachings herein is directed at a bumper comprising a multi-layered composite material, wherein the multi-layered composite material includes: a first metal layer, a second metal layer, a core layer interposed between the first metal layer and the second metal layer, wherein the core layer has a volume that is about 20 volume percent or more of a volume of the multi-layered composite material and the core layer is formed of a filled polymeric material having a specific gravity of about 1.12 or less and includes from 5 to 30 weight percent of a non-metallic conductive filler dispersed in a polymer matrix.

This aspect may be further characterized by one or any combination of the following features: the filled polymeric material includes less than 8 weight percent of metallic filler or is free of metallic filler; the filled polymeric material includes less than 5 weight percent of metallic filler or is free of metallic filler; the non-metallic conductive filler includes a carbon black, a carbon nanotube, or both; a weight ratio of the non-metallic conductive filler to metallic filler is about 1.2 or more (for example, about 1.5 or more, about 1.8 or more, about 2.5 or more, or about 3.0 or more); the carbon black has an iodine number of about 200 mg/g or more, as measured according to ASTM D-1510 and/or an oil absorption number (i.e., OAN) of about 150 $cm^3/g$ or more, as measured according to ASTM D-2414; the iodine number of the carbon black is about 400 mg/g or more (preferably about 600 mg/g or more, more preferably about 800 mg/g or more, and most preferably about 1200 mg/g or more); the oil absorption number is about 200 $cm^3/g$ or more (preferably about 225 $cm^3/g$ or more, more preferably about 250 $cm^3/g$ or more, even more preferably about 275 $cm^3/g$ or more, and most preferably about 300 $cm^3/g$ or more); the non-conductive filler (e.g., the carbon black and/or the carbon nanotube) has a specific gravity of about 1.5 to about 2.7 (preferably about 1.8 to about 2.6); polymeric matrix includes one or more polymers; the one or more polymers includes, consists substantially of, or consists entirely of one or more olefinic polymers, wherein each of the one or more olefinic polymers includes about 95 weight percent or more of one or more olefin monomers (e.g., about 96 weight percent or more, about 98 weight percent or more, about 99 weight percent or more, or about 100 weight percent); a total weight of the non-conductive filler (e.g., the carbon black, the carbon nanotube, or both) and the one or more polymers is about 93 weight percent or more (preferably about 95 weight percent or more, more preferably about 95 weight percent or more, even more preferably about 97 weight percent or more, even more preferably about 98 weight percent or more, and most preferably about 99 weight percent or more), based on a total weight of the filled polymeric material; the one or more polymers includes a thermoplastic polymer (e.g., a thermoplastic olefinic polymer) having a crystallinity of 8 percent or more, as measured by differential scanning calorimetry; the non-metallic filler (e.g., the carbon black, the carbon nanotube, or both) is present in an amount of about 8 to about 30 weight percent (e.g., about 10 to about 30 weight percent, about 9 to about 25 weight percent, about 10 to 20 weight percent, about 12 to about 25 weight percent, about 14 to about 23 weight percent, about 11 to about 17 weight percent, or about 15 to about 21 weight percent), based on the total weight of the filled polymeric material; the filled polymeric material has a melt flow index of about 3.0 g/10 min or less (about 2.0 g/10 min or less, about 1.5 g/109 min or less, about 1.0 g/10 min or less, or about 0.5 g/10 min or less) as measured according to ASTM D1238.0-20 at 190° C./2.16 kg; the bumper is formed from a single blank of the multi-layered composite material; the bumper has a bumper fascia formed from a single blank of the multi-layered composite material; the bumper includes holes or other openings for a fog lamp, a headlight, a grill, access to a towing component, a break light, or any combination thereof; the one multi-layer composite material is characterized by one or any combination of the following: a bond strength of 50 pli or more, as measured according to T-peel test (ASTM D1867), a static flow (e.g., ooze) of the filled polymeric material of about 0.50 g or less after 20 minutes at 180° C. with a mass of 2.72 kg on a 5 cm×5 cm specimen of the multi-layered composite material, a lap shear strength of about 3.0 MPa or more, as measured according to ASTM D1002, a stiffness of about 50 N/mm or more, measured using 3-point bend test (at a thickness of about 1.6 mm with a core layer thickness of about 0.6 mm), or a modulus of the core of about 200 MPa or more (as measured according to ASTM D638); the filled polymeric material has a surface resistivity of about $10^5$ ohm/sq or less, about $10^4$ ohm/sq or less, or about $10^3$ ohm/sq or less; the bumper is formed from a blank having a thickness of about 1.2 mm to about 2.7 mm; a ratio of the thickness of the first metal layer to the thickness of the second metal layer is about 1.4 to about 2.6; the filled polymeric material has an elongation at break of about 400% or more (preferably about 500% or more, more preferably about 600% or more, even more preferably about 700% or more, and most preferably about 800% or more), as measured according to ASTM D638; or the filled polymeric material has a lap shear strength of about 4.5 MPa or more (preferably about 5.0 MPa or more, more preferably about 5.5 MPa or more, even more preferably about 6.0 MPa or more, and most preferably about 7.0 MPa or more), as measured according to ASTM D1002 on a sample having a core layer thickness of about 0.6 mm.

Another aspect of the teachings herein is direct at a method of forming a bumper (such as a bumper according to the teachings herein), comprising the steps of: stamping a blank of a multi-layered composite material into a shape of a bumper; and cutting a first hole in the blank for receiving a fog lamp, a brake light, a headlight, or for accessing a towing component; wherein the multi-layered composite material includes a first metal layer, a second metal layer, a core layer interposed between the first metal layer and the second metal layer, wherein a volume of the core layer is about 20 volume percent or more of a volume of the multi-layered composite material and the core layer is formed of a filled polymeric material having a specific gravity of about 1.12 or less and includes from 5 to 30 weight percent or less of a non-metallic conductive filler dispersed in a polymer matrix.

This aspect may be further characterized by one or any combination of the following features: the method includes drawing the blank in the region of the first hole for reducing or eliminating wrinkling of the bumper; a first cut-out of the blank is removed when cutting the blank for forming the first hole, wherein the first cut-out has a surface that is concave; the method includes forming one or more attachment flanges on an inner or outer perimeter of the bumper, wherein the flange is angled generally perpendicular to an adjoining region of the bumper and includes a flange hole for attaching to a component; for one or more of the flanges (e.g., each of the flanges), a ratio of a width of the flange to the diameter of the flange hole is about 4 or more (e.g., about 5 or more, about 6 or more, about 8 or more, or about 10 or more); the flange includes two flange holes, wherein the multi-layered composite material extends between the two flange holes; a ratio of the distance of the between the flange holes and an average diameter of the flange holes is about 6 or more (e.g., about 10 or more, about 14 or more, about 18 or more, or about 25 or more); the bumper is free of any flanges on the inner perimeter of the first opening; the method includes plating or coating the bumper; the method includes heating the bumper to a temperature of about 140° C. or more (e.g., about 150° C. or more, about 160° C. or more, about 170° C. or more, or about 180° C. or more, for a time of at least 15 minutes (for example in a paint oven); method includes a step of holding down the blank on a perimeter of the part with an interference bead during forming (preferably wherein the perimeter is around an opening); the method includes removing a portion (e.g., a triangular shaped portion) of the multi-layer composite material from an edge where a non-linear flange or wrapping is formed so that wrinkles formed in a compressed area are reduced or eliminated; or the method includes a step of bending the blank in a first stamping step and reducing or eliminating a residual stress by stamping the blank at least partially in a reverse direction.

BRIEF DESCRIPTION OF THE DRAWINGS

As illustrated in FIG. 1, the composite material may be free of buckling and kinks. The core layer 8 may be a filled polymeric material. The core layer 8 may be interposed between two metal layers 4, 6.

As illustrated in FIG. 2, the composite material may be free of delamination.

DETAILED DESCRIPTION

Figure 1:
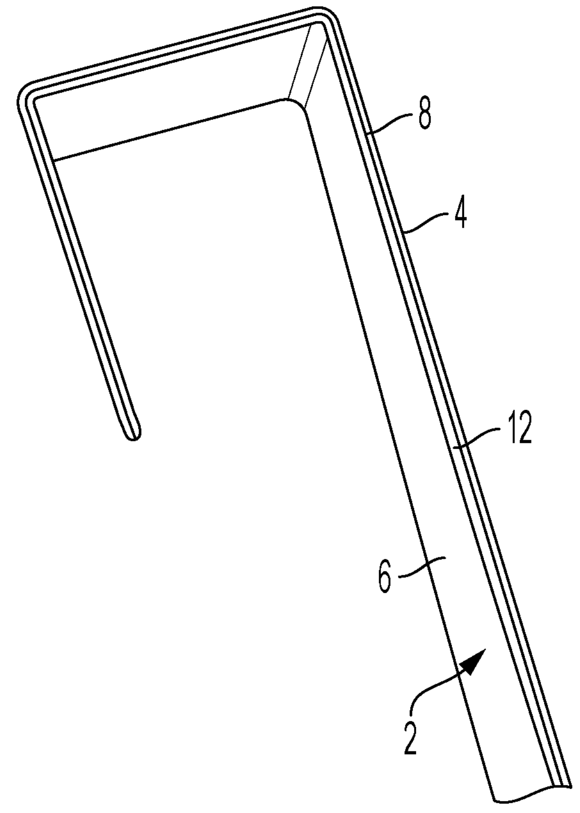
FIG. 1 is an illustrative side view photograph of a multi-layered composite material 2 having a core layer with a non-metallic filler after bending into a J-Bend showing a side edge 12 of the composite material.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The bumpers according to the teaching herein are formed form a blank of a multi-layered composite material. In addition to having metal layers, the multi-layered composite material includes a core layer of a filled polymeric material. The combination of materials for the core layer and the metallic layer together provide for a bumper that is light weight, durable, and can be easily processed in post stamping operations, such as chrome plating or paint/bake cycles.

Density

Density of the Core Layer

The reduction in the density of the multi-layered composite material (and of the bumper) is primarily or even entirely due to the filled polymeric material. The reduction in the density can be achieved by the combination of i) replacing a significant amount of the metal with the filled polymeric material, and ii) reducing the density of the filled polymeric material.

The filled polymeric material preferably has a specific gravity of about 1.25 or less, more preferably about 1.20 or less, even more preferably about 1.15 or less, even more preferably about 1.12 or less, even more preferably about 1.08 or less, and most preferably about 1.04 or less. The filled polymeric material may have a specific gravity of about 0.92 or more, about 0.95 or more, about 0.97 or more, about 0.99 or more, or about 1.01 or more. The amount of the filled polymeric material in the multi-layered composite material preferably is 20 volume percent or more, based on the total volume of the multi-layered composite material. Preferably the filled polymeric material is present in an amount of about 24 volume percent or more, about 28 volume percent or more, about 31 volume percent or more, about 33 volume percent or more, or about 35 volume percent or more. The filled polymeric material may be present in an amount of about 80 volume percent or less, about 70 volume percent or less, about 60 volume percent or less, about 55 volume percent or less, about 50 volume percent or less, or about 45 volume percent or less. The thickness of the filled polymeric material layer in the multi-layered composite material preferably is 20 percent or more, based on the total thickness of the multi-layered composite material. Preferably the thickness of the filled polymeric material layer is about 24 volume percent or more, about 28 percent or more, about 31 percent or more, about 33 percent or more, or about 35 percent or more. The thickness of the filled polymeric material layer may be about 80 percent or less, about 70 percent or less, about 60 percent or less, about 55 percent or less, about 50 percent or less, or about 45 percent or less.

Filler

The filled polymeric material of the core layer includes one or more fillers The filled polymeric material of the core layer includes a non-metallic filler. Preferably, the filled polymeric material also includes one or more metallic fillers.

Non-Metallic Filler

The non-metallic filler may provide stability to the filled polymeric material.

The non-metallic filler preferably is a conductive filler.

The non-metallic conductive filler may provide a conductive flow path for various processes which the bumper may be exposed to during manufacture. For example, the conductive filler may provide a conductive flow path between the metal layers, between the core layer and a metal layer, or along a surface of the core layer. The conductivity of the core layer preferably is sufficient so that the core layer can be readily coated during a coating or plating process, particularly a coating or plating process that uses an electric current. The non-metallic filler may provide a conductive flow path along a surface of the core layer or through the core layer.

The non-metallic filler may reduce a flow of the filled polymeric composition when heated, particularly under low shear conditions. For example, when the bumper proceeds through a heat cycle (such as proceeding through an automotive paint bake oven and/or a e-coat bake oven) the non-metallic filler may prevent or reduce flow of the core layer from between the metallic layers.

Particularly preferred non-metallic conductive filler include carbon blacks and carbon nanotubes. Preferred carbon blacks have an iodine number of about 200 mg/g or more, as measured according to ASTM D-1510 and/or an oil absorption number (i.e., OAN) of about 150 $cm^3/g$ or more, as measured according to ASTM D-2414. Preferably the carbon black has an iodine number of about 400 mg/g or more, more preferably about 600 mg/g or more, even more preferably about 800 mg/g or more, and most preferably about 1200 mg/g or more. The carbon black preferably has an oil absorption number of about 200 $cm^3/g$ or more, more preferably about 225 $cm^3/g$ or more, even more preferably about 250 $cm^3/g$ or more, even more preferably about 275 $cm^3/g$ or more, and most preferably about 300 $cm^3/g$ or more.

The non-metallic filler preferably has a low specific gravity so that the core layer provides weight reduction to the composite material compared to a monolithic metal (e.g., steel) material. The non-metallic filler (e.g., the carbon black) preferably has a specific gravity of about 1.75 or more, about 1.75 or more, about 1.80, about 1.85 or more, or about 1.90 or more. The non-metallic conductive filler (e.g., the carbon black) preferably has a specific gravity of about 2.6 or less, about 2.5 or less, about 2.4 or less, or about 2.3 or less.

The conductive non-metallic filler (e.g., the carbon black) may have a small particle size. For example, the amount of residue on a 100 mesh screen may be about 200 ppm or less or about 100 ppm or less, the amount of residue on a 150 mesh screen may be about 200 ppm or less or about 100 ppm, the amount of residue on a 250 mesh screen may be about 200 ppm or less or about 100 ppm or less, as measured according to ASTM D-1514. As another example, the amount of residue on a 325 mesh screen may be about 1500 ppm or less, about 1000 ppm or less, about 750 ppm or less, about 500 ppm or less, about 400 ppm or less, about 200 ppm or less, or about 100 ppm or less.

Preferred carbon blacks include residue VULCAN XCmax™ 22, KETJAN black EC 600JD (commercially available from NOURYON PULP AND PERFORMANCE CHEMICALS LLC, Marrietta, GA), PRINTEX® XE 2B (commercially available from ORION ENGINEERED CARBONS, Houston, TX), and VULCAN XC72. A particularly preferred carbon black is VULCAN XCmax™ 22, commercially available from CABOT CORPORATION.

The carbon nanotubes may be single wall carbon nanotubes or multiwall carbon nanotubes. The carbon nanotube may have a carbon purity of about 75 weight percent or more, about 80 weight percent or more, about 85 weight percent or more, or about 90 weight percent or more; and/or a carbon purity of about 100 weight percent or less, or about 98 weight percent or less, as measured by thermogravimetric analysis. The carbon nanotube preferably has a diameter (e.g., a weight average diameter) of about 1 nm or more, about 2 nm or more, about 3 nm or more, about 4 nm or more, about 5 nm or more, about 6 nm or more or about 7 nm or more. The carbon nanotube preferably has diameter (e.g., a weight average diameter) of about 400 nm or less, about 200 nm or less, about 80 nm or less, about 50 nm or less, about 30 nm or less, or about 20 nm or less. The carbon nanotube preferably has a length (e.g., a weight average length) of about 0.1 μm or more, about 0.4 μm or more, about 0.6 μm or more, about 0.8 μm or more, about 1.0 μm or more or about 1.2 μm or more. The carbon nanotube preferably has a length (e.g., a weight average length) of about 800 μm or less, about 200 μm or less, about 50 μm or less, about 10 μm or less, about 5 μm or less, or about 3 μm or less. The carbon nanotube may have a generally high surface area, such as measured by BET surface area analysis. BET surface area may be measured according to ASTM D3663-03 (2015). Preferably the BET surface area is about 50 $m^2/g$ or more, more preferably about 100 $m^2/g$ or more, even more preferably about 150 $m^2/g$ or more, and most preferably about 200 $m^2/g$ or more. The BET surface area may be about 1500 $m^2/g$ or less, about 1000 $m^2/g$ or less, about 600 $m^2/g$ or less, or about 400 $m^2/g$ or less.

In order to achieve a high weight reduction of the filled polymeric material, the multi-layered composite material and the bumper, the amount of the filler in the filled polymer composition is generally low. Preferably the total amount of filler, the amount of non-metallic filler, or the amount of carbon black in the filled polymeric layer is about 50 weight percent or less, more preferably about 40 weight percent or less, even more preferably about 30 weight percent or less, even more preferably about 25 weight percent or less, even more preferably about 23 weight percent or less, even more preferably about 21 weight percent or less, and most preferably about 20 weight percent or less. The filled polymeric material preferably includes a sufficient amount of filler so that the material has a low viscosity and/or the material has sufficient electrical conductivity for plating or coating an edge surface of the multi-layered composite material (including plating or coating an edge surface of the core layer). Preferably the total amount of filler in the filled polymeric material is about 2 weight percent or more, more preferably about 3 weight percent or more, even more preferably about 4 weight percent or more, even more preferably about 5 weight percent or more, even more preferably about 7 weight percent or more, even more preferably about 10 weight percent or more, even more preferably about 12 weight percent or more, even more preferably about 14 weight percent or more, and most preferably about 15 weight percent or more. If employed, the amount of the carbon nanotube in the filled polymeric material preferably is about 2 weight percent or more, about 2.5 weight percent or more, about 3.0 weight percent or more, about 3.5 weight percent or more, or about 4.0 weight percent or more. The amount of carbon nanotube in the filled polymeric material preferably is about 10 weight percent or less, about 8 weight percent or less, about 7 weight percent or less, or about 6 weight percent or less, based on the total weight of the filled polymeric material.

The filler may include the carbon black, consist substantially of carbon black, or consist entirely of the carbon black. The filler may include carbon nanotube, consist substantially of carbon nanotube, or consist entirely of carbon nanotube. The filler may include, consist substantially of, or consist entirely of carbon black and carbon nanotube. For example, the amount of the carbon black, the carbon nanotube, or both in the filled polymeric material may be about 50 weight percent or more, about 60 weight percent or more, about 70 weight percent or more, about 80 weight percent or more, or about 90 weight percent or more, based on the total weight of filler in the filled polymeric material. The amount of the carbon black, the carbon nanotube, or both, may be about 100% or less or about 95% or less, based on the total weight of filler in the filled polymeric material.

The combined weight of the conductive non-metallic filler (e.g., the carbon black, the carbon nanotube, or both) and the one or more polymers in the filled polymeric material preferably is about 80 weight percent or more, more preferably about 85 weight percent or more, even more preferably about 87 weight percent or more, and most preferably about 90 weight percent or more (e.g., the combined weight may be about 93 weight percent or more, about 95 weight percent or more, about 97 weight percent or more, about 98 weight percent or more, or about 99 weight percent or more), based on the total weight of the filled polymeric material. The combined weight of the conductive non-metallic filler (e.g., the carbon black, the carbon nanotube, or both) and the one or more polymers may be about 100 weight percent or less. The combined volume of the conductive non-metallic filler (e.g., the carbon black, the carbon nanotube, or both) and the one or more polymers in the filled polymeric material preferably is about 85 volume percent or more, more preferably about 90 volume percent or more, even more preferably about 93 volume percent or more, even more preferably about 95.0 volume percent or more, even more preferably about 97.0 volume percent or more, and most preferably about 98.0 volume percent or more (e.g., about 98.5 volume percent or more, or about 99.0 volume percent or more), based on the total volume of the filled polymeric material.

The amount of the filler (e.g., the amount of the non-metallic conductive filler) preferably is sufficient so that the surface resistivity of the filled polymeric material is about $10^5$ ohm/sq or less, more preferably about $10^4$ ohm/sq or less, and most preferably about $10^3$ ohm/sq or less.

The non-metallic filler may also include one or more non-conductive fillers. If employed, the amount of the non-conductive filler should be sufficiently low so that the filled polymeric material can achieve the low surface resistivity, such as described herein. Preferably, the amount of any non-conductive filler in the filled polymeric composition is about 10 volume percent or less, about 8 volume percent or less, about 6 volume percent or less, about 4 volume percent or less, about 3 volume percent or less, about 2 volume percent or less, or about 1 volume percent or less, based on the total volume of the filled polymeric material. It will be appreciated that the filled polymeric material may be substantially or entirely free of non-conductive filler.

Metallic Filler

Compositions including a metallic filler typically have high specific gravity and inferior properties. As such, the filled polymeric material may be substantially or entirely free of metallic filler. If employed, the amount of the metallic filler preferably is sufficiently low so that the metallic filler (without the non-metallic conductive filler) does not provide conductivity/low surface resistivity to the composition. Preferably the amount of the metallic filler in the filled polymeric material is about 4 volume percent or less, more preferably about 3 volume percent or less, more preferably about 2 volume percent or less, even more preferably about 1.5 volume percent or less (e.g., about 1.0 volume percent or less), based on the total volume of the filled polymeric material. The amount of metallic filler in the filled polymeric material preferably is about 12 weight percent or less, more preferably about 10 weight percent or less, even more preferably about 9 weight percent or less, and most preferably about 8 weight percent or less (for example, about 5 weight percent or less, about 3 weight percent or less, about 2 weight percent or less, or about 1 weight percent or less), based on the total weight of the filled polymeric material. The amount of the metallic filler in the filled polymeric material may be about 0 weight percent or more. The volume of the metallic filler in the filled polymeric composition typically is smaller than the volume of the conductive non-metallic filler. A ratio of the volume of the conductive metallic filler to the volume of the conductive non-metallic filler may be about 1.0 or less, about 0.80 or less, about 0.65 or less, about 0.50 or less, about 0.40 or less, about 0.35 or less, about 0.30 or less, or about 0.26 or less. A ratio of the volume of the metallic filler to the volume of the conductive non-metallic filler may be about 0.0 or more, about 0.02 or more, about 0.04 or more, or about 0.06 or more.

The metallic filler may have any shape. The metallic filler may in the shape of particles having a low aspect ratio (e.g., a ratio of length to width and a ratio of length to thickness of about 3 or more), or may have a high aspect ratio (e.g., plate-like or fiber-like shapes) having an aspect ratio of more than 3. The metallic filler may be sufficient small in shape so that some or all of the metallic filler does not extend from one face surface of the core layer to an opposing face surface of the core layer. Preferably the fraction of metallic filler that extends to opposing face surfaces is about 50% or less, about 30% or less, about 20% or less or about 10% or less. The fraction of metallic filler that extends to the opposing face surfaces may be about 0% or more.

The metallic filler (e.g., metallic fiber) may be formed of any metal. Preferred metals include aluminum and steel. The steel may be a stainless steel or a different steel. The metallic filler may be formed of a metal described herein with respect to the metallic layer(s) or may be a different metal. The metallic filler may have a coating (e.g., a corrosion resistant coating) such as described herein with respect to the metallic layer(s), may have a different coating, or may be uncoated. For example, a metal used in the metallic filler may be the same type of metal (e.g., steel or aluminum) or the same grade of metal as the first or second metallic layers.

Polymer

The filled polymeric material preferably includes one or more polymers. The preferred polymers include one or more olefins. The olefinic polymer may include, consists substantially of or consist entirely of one or more olefinic monomers. Preferred olefinic polymers includes about 95 weight percent or more of one or more olefin monomers (e.g., about 96 weight percent or more, about 98 weight percent or more, about 99 weight percent or more, or about 100 weight percent). The olefinic polymer may be a polyethylene homopolymer, a polyethylene copolymer, a polypropylene homopolymer, a polypropylene copolymer, or a mixture thereof. The one or more polymers may include a mixture of two or more, or a mixture of three or more polymers. The one or more polymers may include a mixture of two or more, or a mixture of three or more olefinic polymers. For example the two or more olefinic polymers may include one or more elastomeric polymer having a crystallinity of about 15% or less (preferably about 5% to about 14%) and/or a melting temperature of about 85° C. or less (preferably about 75° C. or less), and one or more polyethylene resins having a crystallinity of greater than 15% (preferably about 20% or more) and/or a melting temperature of greater than 85° C. (preferably about 100° C. or more).

One or more of the polymers may form a matrix phase. Preferably the conductive non-metallic filler, the non-conductive filler, the metallic filler, or any combination thereof are dispersed in the matrix phase.

The filled polymeric material may include one or more polymers described in US 2020/0262182 A1, incorporated herein by reference in its entirety.

The filled polymeric material preferably has a sufficiently high elongation at break so that the polymer does not fail when subject to internal stresses between the two metal layers. Such a failure may be seen in separation of the metal layers after a bending of the material. The filled polymeric material has an elongation at failure of about 80% or more, preferably about 140% or more, more preferably about 200% or more, even more preferably about 400% or more, even more preferably about 600% or more, and most preferably about 800% or more, as measured according to ASTM D638. The elongation at failure may be about 2500% or less, about 2000% or less, or about 1500% or less.

The adhesion between the metal layers should be sufficiently high so that the filled polymeric material does not delaminate from the metal layer. The adhesion between the metal layer and the polymeric material is characterized by a lap shear strength of about 4.5 MPa or more, preferably about 5.0 MPa or more, more preferably about 5.5 MPa or more, even more preferably about 6.0 MPa or more, and most preferably about 7.0 MPa or more, as measured according to ASTM D1002 on a sample having a core layer thickness of about 0.6 mm.

Metal Layers (i.e., Metallic Layers)

The first metal layer and the second metal layer may be formed of any metal. One or both of the metal layers may include or consist of a steel or an aluminum. Preferably the first metal layer and the second metal layer are formed of steel.

The first metal layer, the second metal layer or both may include one or more features of the metal layers described in US 2020/0262182 A1, incorporated herein by reference in its entirety.

The first metal layer may be an exposed layer which is towards the side of the bumper that is primarily visible when installed on a vehicle. The second metal layer may be a backer layer which is towards the side of the bumper that is primarily facing the vehicle when installed.

Preferably, the first metal layer (e.g., the exposed layer) has a thickness that is the same or greater than a thickness of the second metal layer (e.g., the backing layer). The ratio of the thickness of the first metal layer to the thickness of the second metal layer preferably is about 1.2 or more, more preferably about 1.4 or more, even more preferably about 1.6 or more, even more preferably about 1.7 or more, and most preferably about 1.8 or more. The ratio of the thickness of the first metal layer to the thickness of the second metal layer may be about 6 or less, about 5 or less, about 4 or less, about 3 or less, or about 2.5 or less.

The first metal layer and the second metal layer may be formed of the same metal or may be formed from different metals. For example, the metal layers may be formed of the same or different steels. Preferably, the first metal layer is formed from a metal having a higher tensile strength than the metal of the second metal layer and/or a higher yield stress than the second metal layer. The first metal layer preferably has a tensile yield strength of about 190 MPa or more, more preferably about 210 MPa or more, even more preferably about 230 MPa or more, and most preferably about 250 MPa or more. The first metal layer may have a tensile yield strength of about 650 MPa or less, about 550 MPa or less, about 450 MPa or less, or about 35 MPa or less. The ratio of the tensile yield strength of the first metal layer to the tensile yield strength of the second metal layer may be about 1.00 or more, about 1.10 or more, about 1.20 or more, about 1.30 or more, or about 1.40 or more.

One or both of the metal layers may include a plating or other coating for improving the corrosion resistance of the metal. For example, a metal layer may include a zinc containing layer for improving the corrosion resistance. Preferred corrosion resistant layer may be achieved by a hot dipped galvanizing process or an electrogalvanized process (i.e., e-coating). A particularly preferred corrosion resistant layer is provided by e-coting. Examples of corrosion resistance materials include Versabond zinc phosphate treatment from PPG INDUSTRIES, INC. (Pittsburgh, PA), P6000CX e-coat system from PPG INDUSTRIES, INC., and Axalta EC4027 e-coat systems from AXALTA COATING SYSTEMS (Philadelphia, PA). A corrosion resistance layer may be particularly useful for a bumper that is painted, typically to match or contrast with a color of an automotive body panel. The painting process may include applying a zinc phosphate layer, a primer layer, a base coat layer, a top coat layer, or any combination thereof. The multi-layered composite material preferably is compatible with the various baths and materials used in the process of applying the corrosion resistant layer. The multi-layered composite material does not leach out compounds or otherwise foul, react with, or interfere with these treatments. The multi-layered composite preferably is also compatible with the materials used in the painting.

Figure 8:
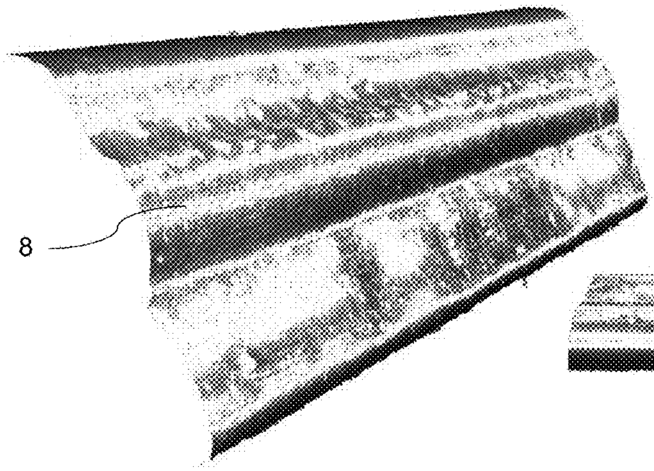
FIGS. 8 and 9 are two views of an optical microscope imaging of an edge of a multi-layered composite material having a core layer including a non-metallic filler after chrome plating the composite material. The core layer maintains a generally smooth surface after chrome plating.
Figure 9:
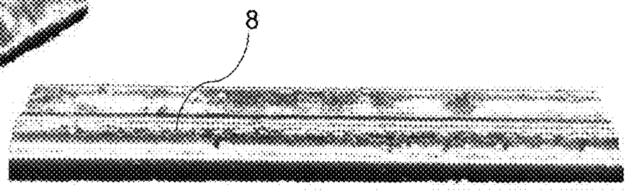

One or both of the metal layers may be substantially free of, or entirely free of a corrosion resistant coating (e.g., a corrosion resistant coating including a zinc, such as zinc phosphate). This may be particularly useful for bumpers that are chrome plated. It will be appreciated that EG or HDG substrates may contaminate the acid baths used in a chrome plating process, due to dissolving of the zinc. The bumper may be chrome plated using a multi-step process. The chrome plating process may include one or more of the steps described in Auto Metal Direct Bumper Factory (Oct. 20, 2015) https://www.youtube.com/watch?v=S5Xe6Jq1DGE (as accessed on Oct. 15, 2020). For example, the process may include a step of acid dipping, plating with one or more layers of nickel (eg., strike nickel, semi-brite nickel, brite nickel, or microporous nickel), and plating with chrome. It will be appreciated that the process may include one or more steps of rinsing with water or acid. One or more of the steps may require a current to flow through the multi-layer composite material. Although the metal layers readily conduct electricity, the core layer has a polymer matrix and consists primarily (i.e., greater than 50 weight percent or greater than 75 weight percent) of non-polymer polymers, such as polyolefins. Without filler, the coating on the edge of the multi-layer composite material is incomplete. However, with 15 weight percent of a non-metallic conductive filler, the coating is generally uniform, such as shown in FIG. 8 and FIG. 9.

The multi-layered composite material preferably is compatible with materials used in chrome plating processes. For example, material does not leach into any of the baths and/or does not fowl any of the baths.

The multi-layered composite material preferably is compatible with materials used in E-coat processes. For example, material does not leach into any of the baths and/or does not fowl any of the baths.

The multi-layered composite material preferably is compatible with materials used in paint process (e.g., primer, base coat, top coat). For example, the multi-layer composite material does not leach into any of the baths and/or does not fowl any of the baths.

Figure 15:
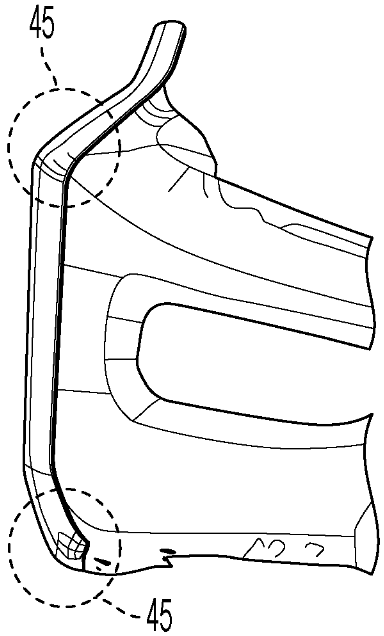
FIG. 15 and FIG. 16 show features of illustrative bumpers including regions 45 near a flange where the blank is subject to compression.
Figure 16:
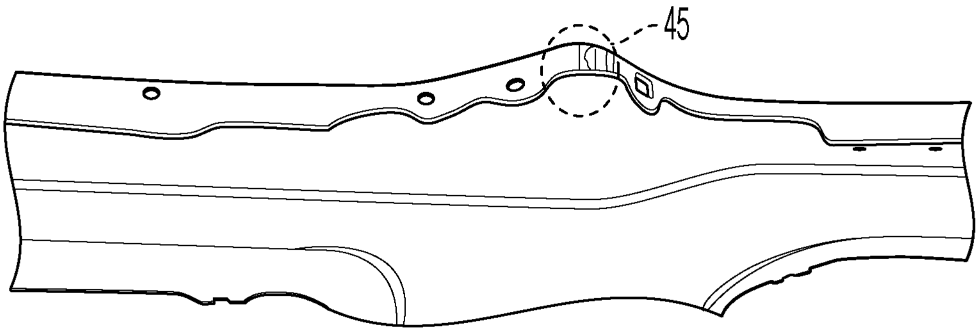

When stamping a traditional metal bumper, the bumper is formed of a monolithic sheet, typically a steel blank. The forming of the bumper can be readily modeled because the flow/draw of the material will be continuous. In contrast, modeling of the multi-layered composite material is more difficult and may provide inaccurate predictions, due to the discontinuities in the multi-layered composite material (e.g., between the first metal layer and the core layer and between the core layer and the second metal layer) and the multiple phases of the filled polymeric material (e.g., the matrix phase and the filler phase). When stamping the multi-layered composite material. one of the layers of the laminate can get trapped resulting in wrinkles. These wrinkles are particularly found in regions where there is compression, such as around openings, and around wrapped edges, particularly where a flange is compressed or bends (see for example FIGS. 15 and 16). Wrinkling defects are reduced or eliminated by modifying the stamping process to reduce or eliminate compression of the composite material. For example, the stamping can be modified so that a continuous stretch is created that eliminates buckling or compression. As another example, a portion of the blank may be cut out to eliminate potential compression, such as in a bend on a flange. Near, openings, a deeper draw can be used to pull out the wrinkles. The resulting cutout of the opening may be concave (such as a bowl shape), or may include an edge that has been drawn (such as a cup shape).

Figure 17:
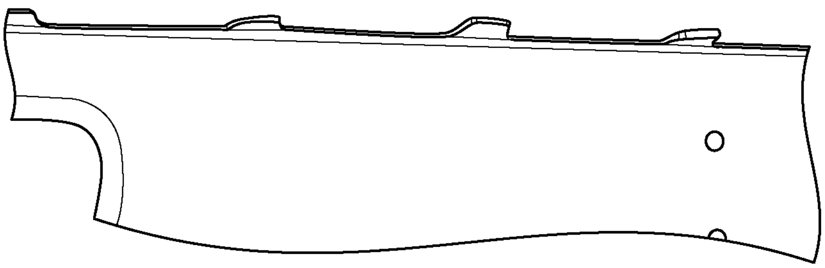
FIG. 17, FIG. 18, and FIG. 19 show features of illustrative bumpers having small flanges (e.g., tab flanges).
Figure 18:
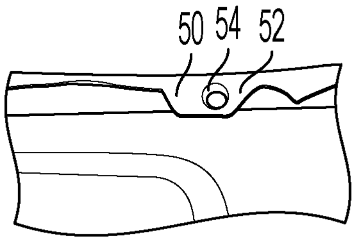
Figure 19:
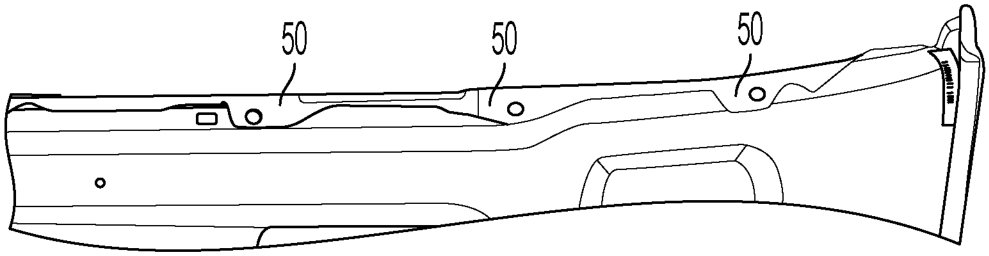
Figure 20:
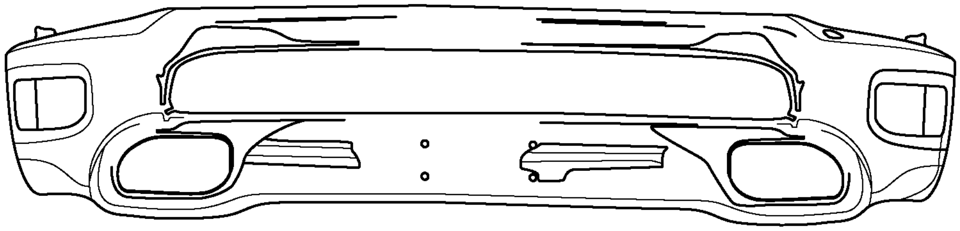
FIG. 20 is a front view of an illustrative bumper showing multiple large openings which may be present in a bumper.

A bumper may include one or more flanges including holes for attaching the bumper to a vehicles. These flanges 50 typically are narrow, such as illustrated in FIG. 18. Here, the distance from the hole in the flange to a lateral side of the flange 52 is about the same as the diameter of the hole 54. These "tab" flanges 50 are relatively weak and may affect the durability of a bumper assembly. When using monolithic steel, it is necessary to use these tab flanges to avoid excess weight of the bumper. As seen in FIG. 17 and FIG. 19, the bumper may have a series of these tab flanges along an edge of the bumper. By using a multi-layer composite material according to the teachings herein, two or more of these tab flanges 50 (or even all of the tab flanges of an edge) may be replaced with a single flange where the distance between a hole in the flange to a lateral side 52 of the flange (or to the next hole) is greater than the diameter of the hole 54 (e.g., the ratio may be about 1.3 or more, about 1.5 or more, about 1.9 or more, about 2.4 or more, about 3.0 or more, about 6.0 or more, about 10 or more, about 14 or more, about 18 or more, or about 25 or more). Even with a single flange, the weight reduction due to the core layer will result in a weight savings of the bumper made with the composite material compared to the bumper made with monolithic steel. Structural improvements can even be provided in the form of ribs or other structural features incorporated into the bumper. Thus, it is possible to provide a bumper with both reduced weight and improved structural performance, such as improved durability.

The bumper may include one or more generally large openings for receiving a component that is attached to the bumper or for accessing or showing a component that is positioned behind the bumper. As used herein, a large opening refers to an opening having a dimension of about 75 mm or more, about 100 mm or more, about 125 mm or more, or about 150 mm or more. Examples of such openings include openings for receiving, accessing, or showing a fog lamp, a headlight, a grill, access to a towing component, a cover, or a break light. The bumper may have two or more, or three or more large openings. The bumper may include a flange for attaching a component at the large opening. Preferably such flanges are free of tab flanges having holes near a lateral side of the flange, as described herein with respect to the attachment of the bumper to the vehicle. In addition to, or in lieu of a flange having holes, the component may be attached using a snap fit. In a preferred aspect, one or more, or even all of the components are attached without the use of a flange having holes. As such, the bumper may include an opening having no flanges or tab flanges.

The method of forming the bumper may include a step of holding down the blank on a perimeter of the part with an interference bead during forming (preferably wherein the perimeter is around an opening. Such a process may draw the material and prevent or reduce wrinkles.

Applicant has determined that any delamination of a metal layer from a core layer after a stamping or bending operation (particularly after a heating of the composite material) may be reduced or eliminated by overbending the material in a first direction and then bending the material back in the reverse direction to achieve a desired bend. During the reverse bend, residual stresses in the deformed material may be reduced or eliminated. As such, the process may include a first stamping step in which a region of a blank is bent in a first direction to achieve a bend angle or curvature, and then bent in a second stamping step in a reverse direction to reduce the bend angle or curvature.

Test Methods

Figure 13:
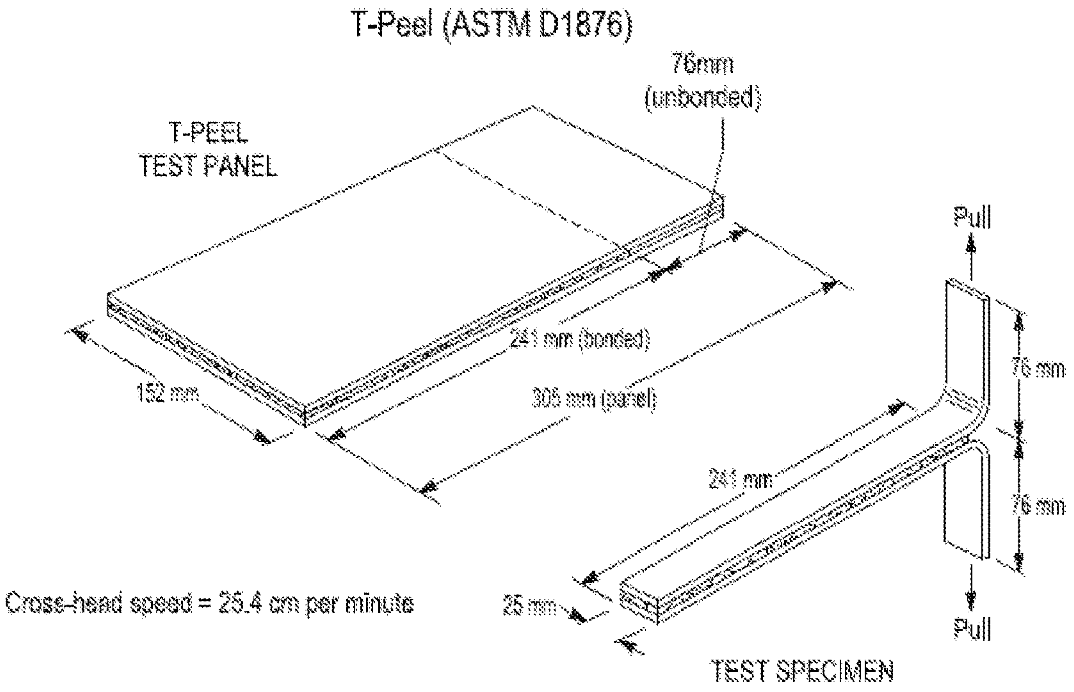
FIG. 13 is a drawing showing features of a T-peel test.

Peel strength (T-Peel) is measured according to ASTM 1876D using a tensile testing machine. The geometry of the test specimen is shown in FIG. 13

Figure 14:
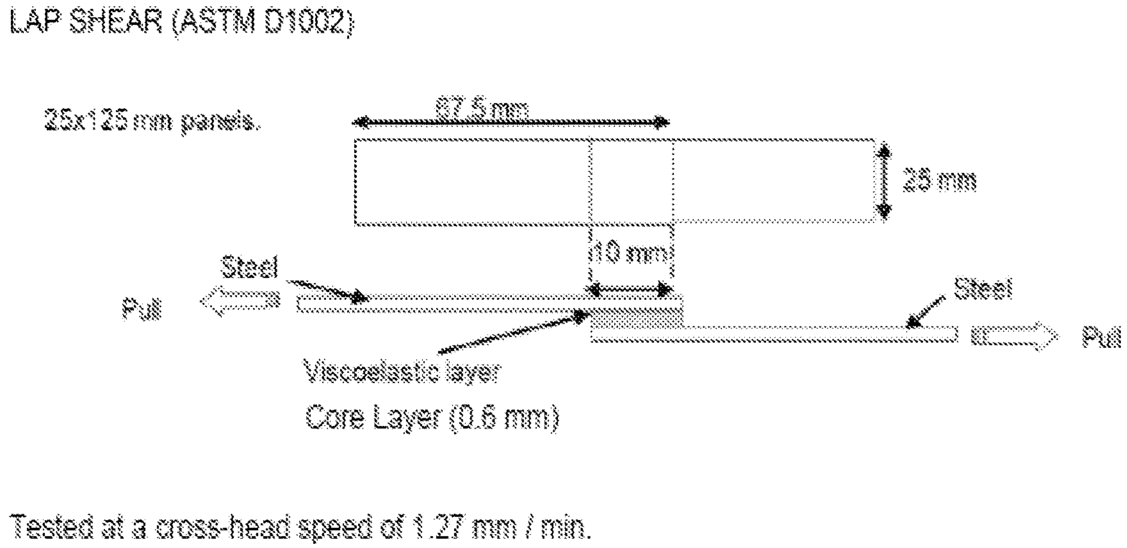
FIG. 14 is a drawing illustrating features of a lap shear test.

Adhesion between the layers of the composite material may by Lap Shear testing according to ASTM D 1002. Specimens may be prepared from a 25 mm×125 mm panel of the composite material by removing portions of the metal layers and the core layer as shown in FIG. 14. The sample is tested at a cross-head speed of about 1.27 mm/min.

Static flow test (i.e., ooze test). The static flow test is measured on a sandwich composite material having a core thickness of about 0.6 mm. The specimen size is 51 mm×51 mm. A preheated weight of 2.72 kg is placed on the composite. The specimen with the weight is heated for 20 minutes at 180° C. The specimen is then trimmed to remove any core material that has flowed out from between the metal layers and is weighed. The result of the static flow test is the mass of the core material that that has flowed out, in units of g.

Figure 12:
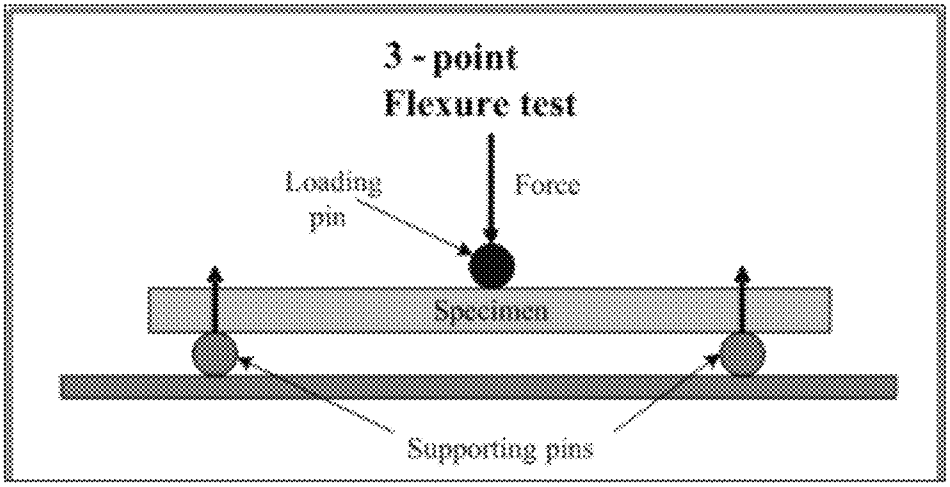
FIG. 12 is a drawing showing features of a three-point bend test.
Figure 12:
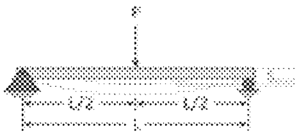

The stiffness of the composite material may be measured using a 3-point bend test such as illustrated in FIG. 12. The span between the support pins is about 101.6 mm, the width of the specimen is about 25.0 mm and the loading pin travels at a speed of about 1.0 mm/min.

Viscosity (mixing torque) of the filled polymeric material is measured in a Haake mixer with mixing with roller blades, at a constant set temperature of about 190° C. and a speed of about 100 rpm, with a fill of about 60%. The torque is measured after mixing for 4.5 minute. The viscosity is in units of m-g.

Melt index of the filled polymer material is measured according to ASTM D1238-20 at 190° C./2.16 kg. The units are g/10 min.

Iodine number (i.e., iodine adsorption number) of the carbon black is measured according to ASTM D1510-16. The iodine number is a measure of the amount of iodine which can be adsorbed on the surface of a given mass of carbon black, and has units of mg/g of carbon.

Oil absorption number (OAN) of the carbon black is measured according to ASTM D2414-19. The oil absorption number is a measure of the amount of dibutyl phthalate or paraffin oil that is absorbed by the carbon black, and has units of $cm^3$/100 g of carbon black. Unless otherwise specified, dibutyl phthalate is used for measuring the oil absorption number.

The density of carbon black is measured according to ASTMD1513-05.

The particle size of the carbon black (for example the 325 mesh residue) is measured according to ASTM D1514-15e1, with units of ppm.

Corrosion resistance is tested according to Copper Accelerated Acetic Acid Salt Spray (CASS) for 66 hours, according to ASTM B368-09. Testing can be performed on a specimen of the composite material or on a specimen of the metal. Unless otherwise specified, the testing is performed after chrome plating.

Tensile properties of the materials (e.g., modulus, tensile strength, yield stress, elongation) may be measured according to ASTM D638).

Resistivity of the core layer may be measured using an SCS 770760 Resistance Pro Meter Kit. Resistance point to point (Rtt) is measured with two electrodes placed on a specimen of the filled polymeric material of the core layer. The specimen has a size of about 300 mm×300 mm. The specimen is placed on an insulating surface. The resistivity is measured using two electrodes each having a mass of about 2.27 kg. The electrodes are both placed on the specimen with a separation of about 253 mm. The meter has a resistance range of $1\times10^3$ to $1\times10^{12}$ ohms.

Materials

Polymer A is a linear low density polyethylene copolymer having a specific gravity of about 0.92, a melting temperature of about 119° C., a 2% secant modulus of about 210 MPa, and a crystallinity (polyethylene crystals) of greater than about 25%.

Polymer B is a semi-crystalline polyethylene elastomer that is a random ethylene-octene copolymer having a specific gravity of about 0.89, a melting temperature of about 55° C., a 2% secant modulus of about 14.4 MPa, and a crystallinity (polyethylene crystals) of greater than 5% and less than about 20%.

Polymer C is a polyethylene that is a low molecular weight random copolymer of ethylene and one or more additional olefinic monomers and has a specific gravity of about 0.92.

Filler-A is a carbon black having an iodine number of about 1200 to 1500 mg/g and an oil absorption number of about 300 to about 340 $cm^2$/100 g. The reside on 325 mesh screen is less than 100 ppm, and the density is about 1.80 g/$cm^3$ to about 2.00 g/$cm^3$.

Filler-B is a metal filler including short stainless steel fibers having a density of about 7.85 g/$cm^3$.

Filler-C is a multiwall carbon nanotube commercially available from NANOCYL SA (Belgium) as NC7000™ having an average diameter of about 9.5 nm, an average length of about 1.5 μm, a carbon purity of about 90%, and a BET surface area of about 250-300 $m^2$/g.

Filler-D is a carbon black having an iodine number of about 253, an oil absorption number of about 192 $cm^3$/100 g, and less than 10 ppm residue on a 325 mesh screen.

Metal-A1 is an HSLA steel having a yield stress of about 300 MPa, a Poisson's ratio of about 0.30, a Rockwell Hardness of about 70-76 B, and a thickness of about 0.70. Metal-A1 is free of corrosion resistance coating (such as zinc containing coating).

Metal-A2 is a mild, formable steel (CS type B) having a yield stress of about 210 MPa, a Poisson's ratio of about 0.3, a Rockwell Hardness of about 40 B, and a thickness of about 0.34 mm. Metal-A2 is free of corrosion resistance coating (such as zinc containing coating).

Metal-B1 is similar to Meta-A1, except the metal has a corrosion resistance coating including zinc.

Metal-B2 is similar to Metal-A2, except the metal has a corrosion resistance coating including zinc.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

EXAMPLES

Example 1

Example 1 is a filled polymeric composition including about 15 weight percent of Filler-A, about 42.5 weight percent Polymer-A and the balance being a mixture of Polymer-B and Polymer-C. Example 1 has a tensile modulus of about 205 MPa, an elongation at break of about 1200%, and a density of about 1.02 g/$cm^3$. The viscosity of the filled polymeric composition is about 11,300 m-g (measured in a Haake mixer at 60 rpm).

Example 2

Example 2 is a filled polymer polymeric composition including about 52 weight percent of Filler-B, about 23.8 weight percent of Polymer-A, and the balance being a mixture of Polymer-B and Polymer-C. Example 2 has a tensile modulus of about 299 Mpa, an elongation at break of about 363%, and a density of about 1.60 g/cm3. The viscosity of the filled polymeric composition is about 8200 m-g (measured in a Haake mixer at 60 rpm).

Example 3 is a sandwich composite include a core layer of about 0.60 mm thickness formed from Example 1 interposed between an exposed layer of Metal-A1, and a backing layer of Metal-A2.

Example 4 is a sandwich composite include a core layer of about 0.60 mm thickness formed from Example 2 interposed between an exposed layer of Metal-A1, and a backing layer of Metal-A2.

Example 5 is a sandwich composite include a core layer of about 0.60 mm thickness formed from Example 1 interposed between an exposed layer of Metal-B1, and a backing layer of Metal-B2.

Figure 10:
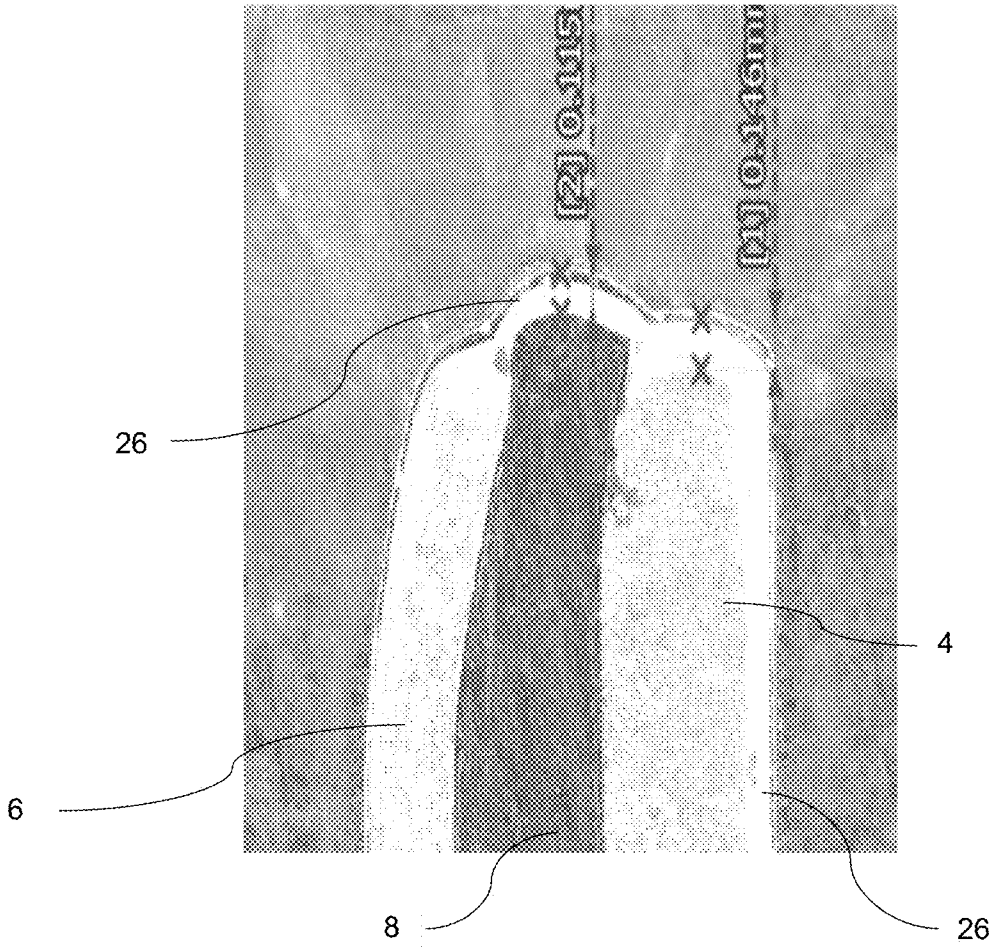
FIG. 10 is an optical microscope imaging of a cross-section of a multi-layered composite material having a core layer including a non-metallic filler after chrome plating. The thickness of the chrome plating is about 0.115 mm over the core layer and about 0.146 mm over the metal layers.
Figure 11:
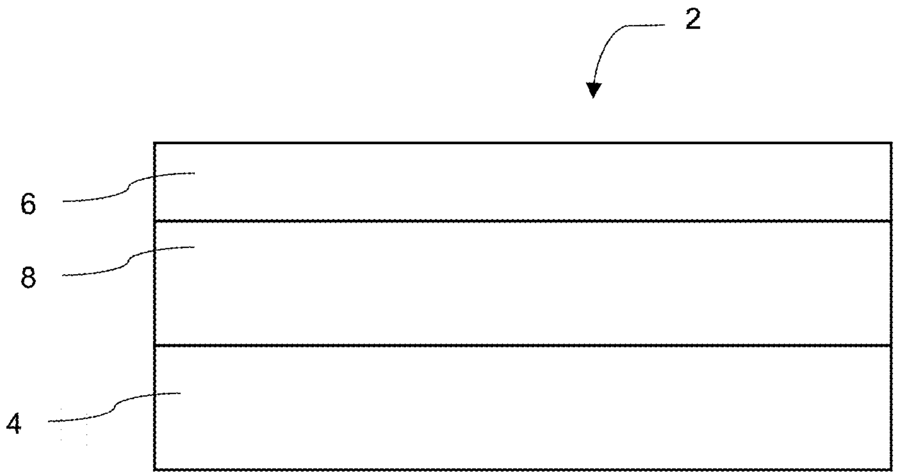
FIG. 11 is a drawing showing an illustrative cross-section a multi-layered composite material according to the teachings herein.

Example 6 is a sandwich composite include a core layer of about 0.60 mm thickness formed from Example 2 interposed between an exposed layer of Metal-B1, and a backing layer of Metal-B2.

corrosion testing there is no corrosion visible on the face surfaces. The thickness of the chrome layer 26 is about 0.115 mm over the core layer 8 (along the edge of the composite) and about 0.146 mm over the metal layers 4, 6, as seen in the cross-section view in FIG. 10.

Bumpers are stamped from blanks formed from the composite material of Example 3. The stamping process is adjusted to reduce or eliminate compression of the composite material. The resulting bumper is generally free of wrinkles and buckling. The bumpers are processed through automotive e-coat and automotive paint process including bake cycles. There is no fouling of the e-coat materials/baths, and the non-metallic filler in the core layer provides sufficient electrical conductivity for the e-coating operation. The composite material is compatible with the e-coat and paint materials and process and there is no sign of delamination of the layers of the composite material.

Bumpers are stamped from blanks formed from the composite material of Example 5. The stamping process is adjusted to reduce or eliminate compression of the composite material. The resulting bumper is generally free of wrinkles and buckling. The bumpers are processed through

TABLE 1

| | | Example 3 | Example 4 | Example 5 | Example 6 |
|---|---|---|---|---|---|
| Materials | | | | | |
| Exposed Layer | | Metal-A1 | Metal-A1 | Metal-B1 | Metal-B1 |
| Core Layer | | Example 1 | Example 2 | Example 1 | Example 2 |
| Backing Layer | | Metal-A2 | Metal-A2 | Metal-B2 | Metal-B2 |
| Thickness of Layers | | | | | |
| Exposed Layer | mm | 0.70 | 0.70 | 0.70 | 0.70 |
| Core Layer | mm | 0.60 | 0.60 | 0.60 | 0.60 |
| Backing Layer | mm | 0.34 | 0.34 | 0.34 | 0.34 |
| Total Thickness | mm | 1.64 | 1.64 | 1.64 | 1.64 |
| Properties | | | | | |
| Filler Type | | Non-metallic | Metallic | Non-metallic | Metallic |
| Surface density | $kg/m^2$ | 8.77 | 9.12 | 8.77 | 9.12 |
| Volume density | $g/cm^3$ | 5.35 | 5.56 | 5.35 | 5.56 |

| Properties | | Example 3 | Example 4 |
|---|---|---|---|
| T-Peel (initial) | pli | 83 | 99 |
| T-Peel (after 30 min @180° C.) | pli | 129 | 118 |
| Static Flow (20 min @ 180° C., 6 lb. load) | g | 0.001 | 0.101 |
| Initial Stiffness | N/mm | 53.9 | 52.0 |
| Lap shear strength | MPa | 8.0 | 4.8 |

Figure 2:
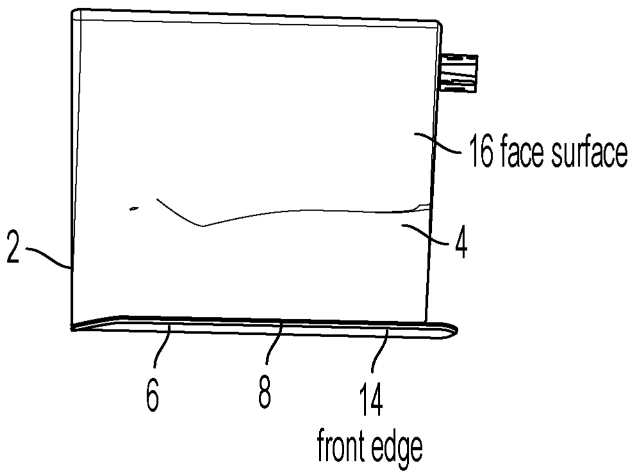
FIG. 2 is an illustrative front view photograph of a multi-layered composite material having a core layer with a non-metallic filler after bending into a S-Bend showing a face (i.e., face surface 16) of the composite material and a bottom edge 14 (i.e., front edge) of the composite material.
Figure 3:
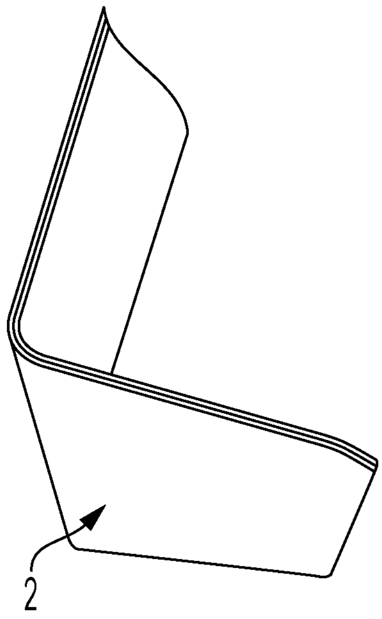
FIG. 3 is an illustrative photograph of the S-Bend sample of FIG. 2 after heating at 196° C. for about 30 minutes.
Figure 4:
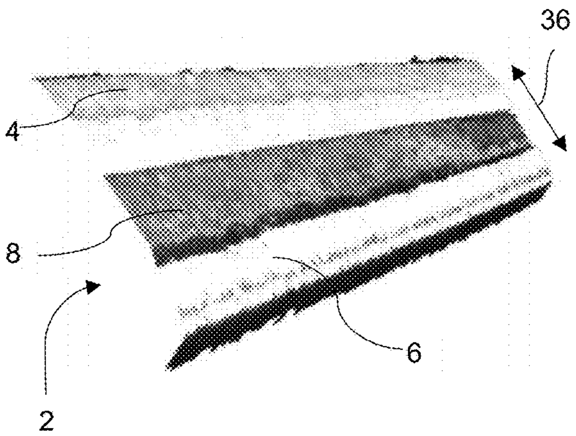
FIG. 4 is an optical microscope imaging of an edge of a multi-layered composite material 2 having a non-metallic filler. The thickness direction 36 of the composite is shown in FIG. 4.
Figure 5:
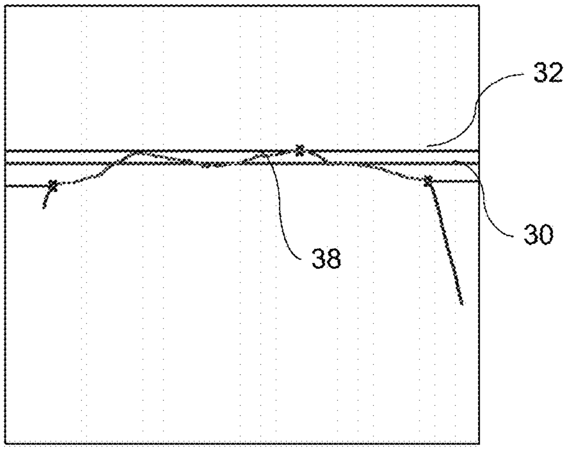
FIG. 5 is a graph showing the height profile 38 of the core layer including a non-metallic filler from FIG. 4. The horizontal lines correspond to the minimum height 30 and the maximum height 32 of the core layer. The core layer is generally smooth with a maximum difference (i.e., maximum height minus minimum height) in height of less than about 0.100 mm.
Figure 6:
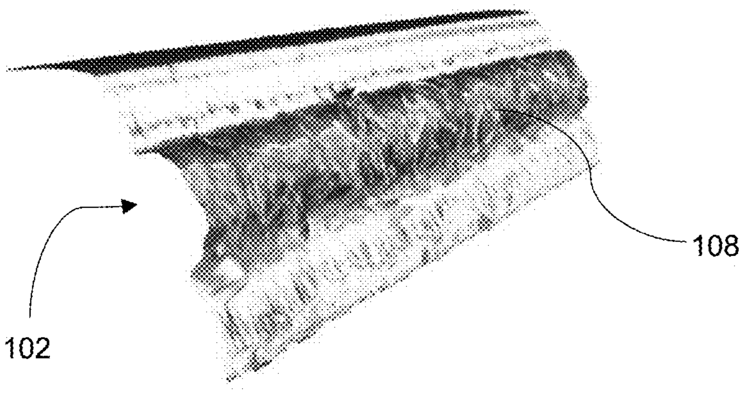
FIG. 6 is an optical microscope imaging of an edge of a multi-layered composite material 102 having a core layer 108 including a metallic filler.
Figure 7:
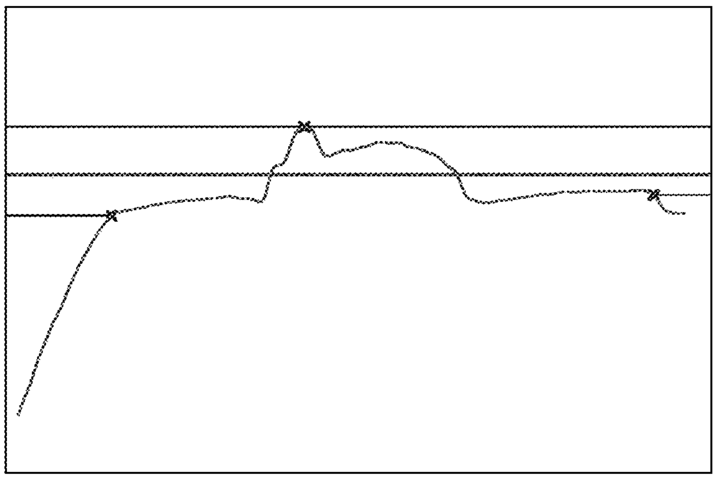
FIG. 7 is a graph showing the height profile of the core layer including a metallic filler from FIG. 6. The core layer is generally rough with a maximum difference in height of greater than about 0.200 mm.

Example 3 is bent to form a J-bend (see FIG. 1). The sample shows no sign of bucking, kinks, or delamination. Example 3 is bent to form an S-bend (see FIG. 2, FIG. 3). The bent sample shows no signs of buckling, kinks, or delamination.

Example 7

In Example 7, the composite material of Example 3 is chrome plated. The chrome plated edge surface is shown using optical microscopy analysis in FIG. 8 and FIG. 9. The surface is generally smooth with no sharp peaks and a variation in thickness. Example 7 is tested for corrosion resistance using CASS accelerated testing (66 hours). After a multi-step chrome plating process including cleaning, washing, nickel plating and chrome plating steps. There is no fouling of any of materials used in the chrome plating process. The composite material is compatible with the chrome plating materials and process and there is no sign of delamination of the layers of the composite material.

Examples 8-14

Core layers are prepared by mixing filler with multiple polyethylene polymers. The fiber and amount of fiber is listed in Table 2. The properties in Table 2 are for the core layer material after pressing to a thickness of about 0.4 to 0.6 mm.

TABLE 2

| | Example 8 | Example 9 | Example 10 | Example 11 | Example 12 |
|---|---|---|---|---|---|
| Filler-A, weight percent | | | 10 | | |
| Filler-B, weight percent | 52.5 | 70 | | | |
| Filler-C, weight percent | | | 3 | 6 | |
| Filler-D, weight percent | | | | | 16 |
| Thickness, mmm | 0.6 | 0.4 | 0.62 | 0.63 | 0.54 |
| Tensile Modulus (MPa) | 299 | 333 | 101 | 90 | 179 |
| Elongation at Break, % | 363 | 52 | 881 | 798 | 740 |
| Surface Resistivity (Ω/sq) | $6 \times 10^{12}$ | $9.4 \times 10^3$ | $<1 \times 10^3$ | $<1 \times 10^3$ | $7 \times 10^4$ |

| | Example 13 | Example 14 |
|---|---|---|
| Filler-A, weight percent | 16 | 20 |
| Filler-B, weight percent | | |
| Filler-C, weight percent | | |
| Filler-D, weight percent | | |
| Thickness, mmm | 0.58 | 0.54 |
| Tensile Modulus (MPa) | 214 | 161 |
| Elongation at Break, % | 891 | 667 |
| Surface Resistivity (Ω/sq) | $<1 \times 10^3$ | $<1 \times 10^3$ |

* the lower limitation of the instrumentation is $1 \times 10^3$ Ω/sq.

Figure 21:
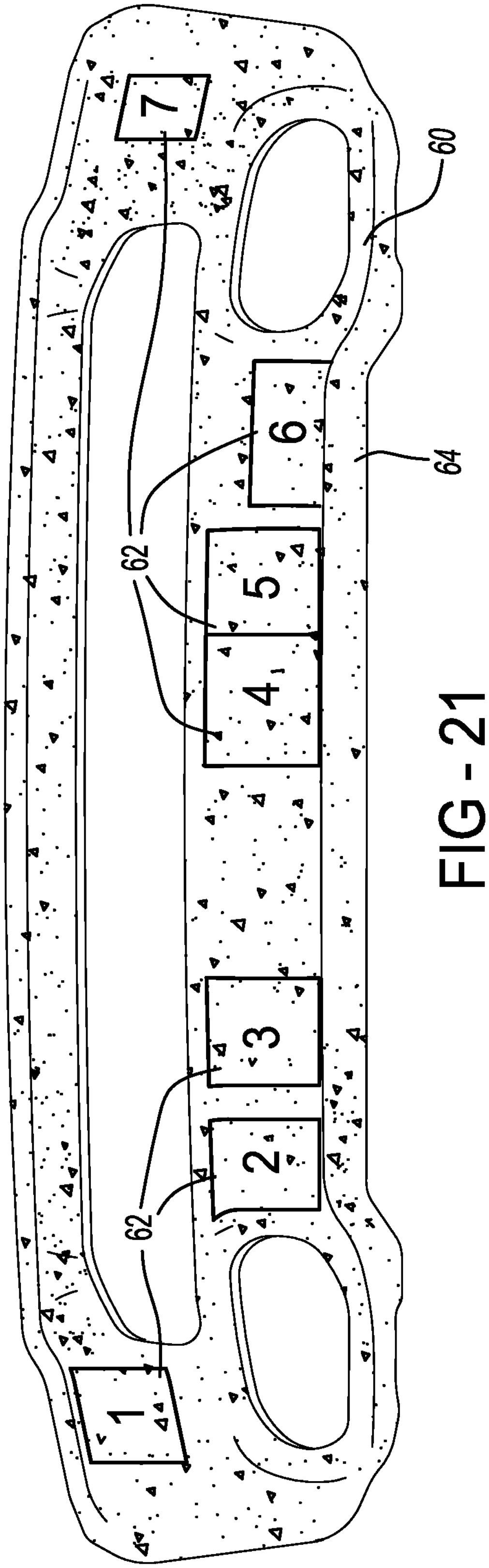
FIG. 21 is an image of an illustrative bumper (Example 15) after accelerated dent testing.
Figure 22:
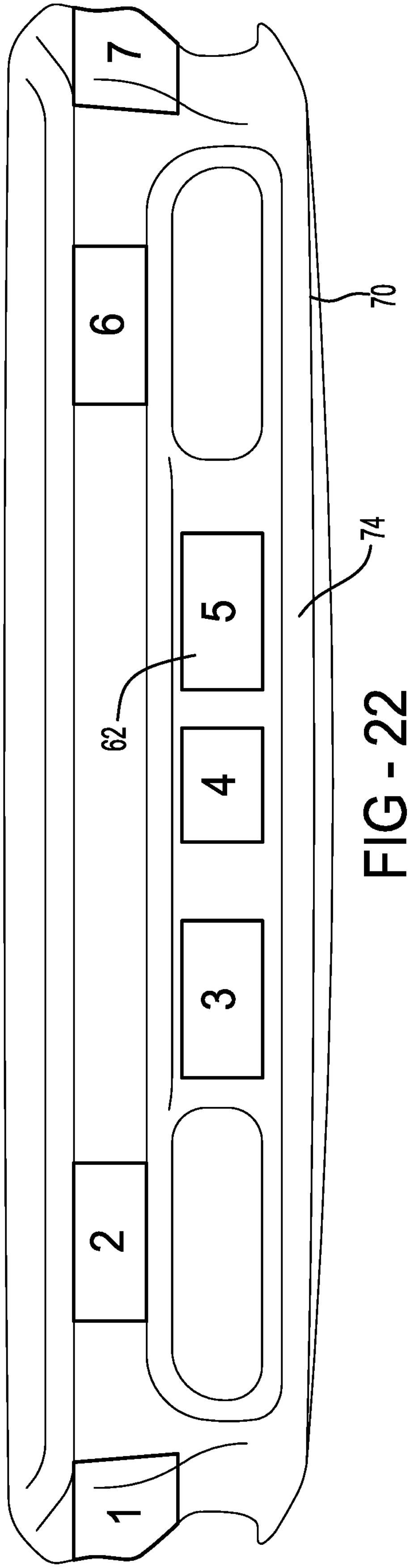
FIG. 22 is an image of an illustrative bumper (Example 16) after accelerated dent testing.

Examples 15 and 16 are bumpers formed from composite materials including a core layer is prepared having a thickness of about 0.50 mm with a filled polymeric material having a matrix layer including a mixture of polyethylene copolymers and polyethylene elastomer (polymer concentration of about 73 weight percent) with about 17 weight percent Filler-A and about 10 weight percent Filler-B. The volume ratio of filler B to Filler A is about 0.141. The core layer is interposed between a backing layer and exposed layer. The backing layer is Metal-B2. The exposed layer is the same as Metal-B1, except the thickness is 0.65 mm and 0.80 mm, for Examples 15 and 16 respectively. Examples 15 and 16 are each stamped into a bumper. The bumper is subject to an accelerated dent test to simulate the impact of stones and other road debris onto the bumper surface. After the accelerated dent test, the bumper 60 of Example 15 (FIG. 21) has much more dents than the bumper 70 of Example 16 (FIG. 22). For each bumper 60, 70, seven sample regions 62, 72 were removed (as shown in FIG. 21 and FIG. 22 by black outlined rectangular regions, each adjacent to an adhesive note 64, 74 identifying the region number) and evaluated. In each sample region, the dents were counted and characterized by depth. The results for Example 15 are summarized in Table 3 and the results for Example 16 are summarized in Table 16.

TABLE 3

| Dent test results of Example 15 | | | | | | | | |
|---|---|---|---|---|---|---|---|---|
| | Region 1 | Region 2 | Region 3 | Region 4 | Region 5 | Region 6 | Region 7 | Total |
| Area (in$^2$) | 17.73 | 13.49 | 14.58 | 16.69 | 14.28 | 14.28 | 9.92 | 651.4 |
| # of Dents | 24 | 41 | 33 | 45 | 41 | 33 | 18 | 233 |
| Dent concetration (#/in$^2$) | 1.35 | 3.04 | 2.26 | 2.70 | 2.87 | 2.31 | 1.81 | 0.359 |
| Diameter (mm) | | | | | | | | |
| Max | 5.78 | 4.00 | 11.39 | 2.65 | 3.54 | 4.10 | 5.21 | |
| Avg | 1.74 | 1.77 | 4.42 | 1.31 | 1.55 | 1.91 | 2.11 | |
| Depth (mm) | | | | | | | | |
| Max | 0.25 | 0.31 | 0.57 | 0.18 | 0.28 | 0.47 | 0.27 | 0.574 |
| Avg | 0.07 | 0.08 | 0.13 | 0.08 | 0.08 | 0.13 | 0.10 | 0.095 |

TABLE 4

| Dent test results of Example 16 | | | | | | | | |
|---|---|---|---|---|---|---|---|---|
| | Region 1 | Region 2 | Region 3 | Region 4 | Region 5 | Region 6 | Region 7 | Total |
| Area (in$^2$) | 15.72 | 15.14 | 14.91 | 9.92 | 11.14 | 13.97 | 16.43 | 627.2 |
| # of Dents | 2 | 1 | 6 | 5 | 3 | 6 | 5 | 28 |
| Dent concetration (#/in$^2$) | 0.13 | 0.07 | 0.40 | 0.50 | 0.27 | 0.43 | 0.30 | 0.047 |
| Diameter (mm) | | | | | | | | |
| Max | 0.102 | 0.060 | 0.152 | 0.116 | 0.122 | 0.127 | 0.089 | |
| Avg | 0.065 | 0.060 | 0.104 | 0.102 | 0.081 | 0.087 | 0.058 | |

TABLE 4-continued

| Dent test results of Example 16 | | | | | | | | |
|---|---|---|---|---|---|---|---|---|
| | Region 1 | Region 2 | Region 3 | Region 4 | Region 5 | Region 6 | Region 7 | Total |
| Depth (mm) | | | | | | | | |
| Max | 0.002 | 0.001 | 0.006 | 0.004 | 0.003 | 0.007 | 0.002 | 0.183 |
| Avg | 0.002 | 0.001 | 0.002 | 0.003 | 0.002 | 0.003 | 0.001 | 0.057 |

In Example 15, the total number of dents in regions 1 through 7 having a depth of greater than 0.10 mm is 79. In Example 16, the total number of dents in regions 1 through 7 having a depth greater than 0.10 mm is 4, which is comparable to the results seen when testing a bumper formed of monolithic steel having a thickness of about 1.6 mm.

In Example 16, the number of dents, the maximum diameter of the dents, the average diameter of the dents, the maximum depth of the dents, the average depth of the dents, and the number of dents greater than 0.10 mm are all significantly decreased compared with Example 15.

What is claimed is:

1. A bumper comprising a multi-layered composite material, wherein the multi-layered composite material includes:

a first metal layer, a second metal layer, a core layer formed of a filled polymeric material interposed between the first metal layer and the second metal layer, wherein the core layer has a volume that is about 20 volume percent or more of a volume of the multi-layered composite material and the core layer has a specific gravity of about 1.12 or less and includes from 5 to 30 weight percent of a non-metallic conductive filler dispersed in a polymer matrix;

wherein a ratio of a volume of any metallic filler in the filled polymeric material to a volume of the non-metallic conductive filler is less than 0.5;

wherein the polymeric matrix includes one or more polymers, wherein the one or more polymer includes an olefinic polymer including about 95 weight percent or more of one or more olefin monomers;

wherein a surface of the multi-layered composite material has a chrome plating;

wherein the bumper includes one or more tab flanges;

wherein the filled polymeric material includes less than 1 weight percent of the metallic filler or is free of the metallic filler;

wherein the non-metallic conductive filler includes a carbon black having an iodine number of more than 1000 mg/g, as measured according to ASTM D-1510.

2. The bumper of claim 1, wherein the non-metallic conductive filler includes a carbon black, a carbon nanotube, or both.

3. The bumper of claim 1, wherein the volume ratio of the metallic filler to the non-metallic conductive filler is 0.26 or less.

4. The bumper of claim 2, wherein the carbon black has an oil absorption number of 250 $cm^3$/100 g or more, as measured according to ASTM D-2414.

5. The bumper of claim 1, wherein the filled polymeric material is free of the metallic filler.

6. The bumper of claim 1, wherein the non-metallic conductive filler has a specific gravity of about 1.8 to about 2.6.

7. The bumper of claim 1, wherein a total weight of the non-metallic conductive filler and the one or more polymers is about 93 weight percent or more, based on a total weight of the filled polymeric material; and the filled polymeric material is free of the metallic filler or includes 0.5 volume percent or less of the metallic filler.

8. The bumper of claim 7, wherein the one or more polymers is a thermoplastic polymer having a crystallinity of 8 percent or more, as measured by differential scanning calorimetry.

9. The bumper of claim 7, wherein the non-metallic conductive filler is present in an amount of about 8 to about 30 weight percent, based on the total weight of the filled polymeric material.

10. The bumper of claim 7, wherein the filled polymeric material has a melt flow index of about 3.0 g/10 min or less as measured according to ASTMD1238.0-20 at 190° C./2.16 kg.

11. The bumper of claim 7, wherein the multi-layered composite material is characterized by one or any combination of the following:

a) a bond strength of 50 pli or more, as measured according to T-peel test, as measured according to ASTM D 1876;

b) a static flow of the filled polymeric material of about 0.50 g or less after 20 minutes at 180° C. with a mass of 2.72 kg on a 5 cm×5 cm specimen of the multi-layered composite material;

c) a lap shear strength of about 3.0 MPa or more, as measured according to ASTM D1002;

d) a stiffness of about 50 N/mm or more, measured using 3-point bend test, at a thickness of about 1.6 mm with a core layer thickness of about 0.6 mm;

e) a modulus of the core of about 200 MPa or more, as measured according to ASTM D638; or f) any combination.

12. The bumper of claim 1, wherein the bumper has a bumper fascia formed from a single blank of the multi-layered composite material.

13. The bumper of claim 1, wherein the bumper includes holes or other openings for a fog lamp, a headlight, a grill, access to a towing component, a break light, or any combination thereof.

14. The bumper of claim 1, wherein the bumper is formed from a blank having a thickness of about 1.2 mm to about 2.7 mm; and/or a ratio of the thickness of the first metal layer to the thickness of the second metal layer is about 1.4 to about 2.6.

15. The bumper of claim 1, where the filled polymeric material has:

i) an elongation at break of about 400% or more, as measured according to ASTM D638; and/or ii) a lap shear strength of about 4.5 MPa or more, as measured according to ASTM D1002 on a sample having a core layer thickness of about 0.6 mm; and/or iii) a surface resistivity of about $10^5$ ohm/sq or less.

16. The bumper of claim 1, wherein the one or more tab flanges includes a tab flange characterized by a hole having a diameter, D, and a distance, x, between the hole and a lateral side of the flange, wherein a ratio of x:D is about 1.5 or more.

* * * * *